United States Patent
Ohwa

(10) Patent No.: US 8,786,736 B2
(45) Date of Patent: Jul. 22, 2014

(54) IMAGE PROCESSING APPARATUS AND METHOD CAPABLE OF SUPPRESSING IMAGE QUALITY DETERIORATION, AND STORAGE MEDIUM

(75) Inventor: Yasushi Ohwa, Machida (JP)

(73) Assignee: Canon Kabushiki Kaisha (JP)

( * ) Notice: Subject to any disclaimer, the term of this patent is extended or adjusted under 35 U.S.C. 154(b) by 251 days.

(21) Appl. No.: 13/307,221

(22) Filed: Nov. 30, 2011

(65) Prior Publication Data

US 2012/0133805 A1 May 31, 2012

(30) Foreign Application Priority Data

Nov. 30, 2010 (JP) .................................. 2010-266974

(51) Int. Cl.
 *H04N 5/217* (2011.01)
 *G06K 9/40* (2006.01)

(52) U.S. Cl.
 USPC ........................................... 348/241; 382/260

(58) Field of Classification Search
 USPC .............. 348/222.1, 241, 246, 247, 272, 273; 382/254, 260–265
 See application file for complete search history.

(56) References Cited

U.S. PATENT DOCUMENTS

| | | | |
|---|---|---|---|
| 7,321,400 B1* | 1/2008 | Chou et al. | 348/616 |
| 2003/0231193 A1* | 12/2003 | Shimazaki et al. | 345/690 |
| 2006/0119896 A1* | 6/2006 | Chen et al. | 358/3.26 |
| 2006/0204088 A1* | 9/2006 | Hsieh et al. | 382/167 |
| 2007/0046786 A1* | 3/2007 | Tokuyama | 348/222.1 |
| 2011/0103702 A1* | 5/2011 | Lim et al. | 382/233 |
| 2011/0205235 A1* | 8/2011 | Mishima et al. | 345/581 |
| 2012/0307116 A1* | 12/2012 | Lansel et al. | 348/273 |

FOREIGN PATENT DOCUMENTS

JP 08-138045 A 5/1996

* cited by examiner

*Primary Examiner* — Timothy J Henn
(74) *Attorney, Agent, or Firm* — Rossi, Kimms & McDowell LLP

(57) ABSTRACT

An image processing apparatus capable of suppressing image quality deterioration in an output image region determined based on reference pixel regions including image ends. The image processing apparatus includes a coefficient selection value generator that generates a coefficient selection value according to a filter coefficient changeover control signal supplied from a region information controller. In accordance with the coefficient selection value, filter coefficient sets are respectively output from coefficient tables. One of the filter coefficient sets is selected by a selector in accordance with a coefficient set selection value supplied from a coefficient set selection unit. Using filter coefficients that constitute the selected filter coefficient set, an image processor performs arithmetic processing on image data on a per pixel of interest basis while referring to peripheral pixels.

12 Claims, 26 Drawing Sheets

FIG. 5A

| KSEL | KSET NAME | NUMBER OF TAPS | KSET1 | | | | | | |
|---|---|---|---|---|---|---|---|---|---|
| | | | K1 | K2 | K3 | K4 | K5 | K6 | K7 |
| 0 | K1tap | 1 | 0 | 0 | 0 | 1 | 0 | 0 | 0 |
| 1 | K1tap | 1 | 0 | 0 | 0 | 1 | 0 | 0 | 0 |
| 2 | K3tap | 3 | 0 | 0 | 1/4 | 1/2 | 1/4 | 0 | 0 |
| 3 | K3tap | 3 | 0 | 0 | 1/4 | 1/2 | 1/4 | 0 | 0 |
| 4 | K3tap | 3 | 0 | 0 | 1/4 | 1/2 | 1/4 | 0 | 0 |
| 5 | K3tap | 3 | 0 | 0 | 1/4 | 1/2 | 1/4 | 0 | 0 |
| 6 | K3tap | 3 | 0 | 0 | 1/4 | 1/2 | 1/4 | 0 | 0 |
| 7 | K1tap | 1 | 0 | 0 | 0 | 1 | 0 | 0 | 0 |

FIG. 5B

| KSEL | KSET NAME | NUMBER OF TAPS | KSET2 | | | | | | |
|---|---|---|---|---|---|---|---|---|---|
| | | | K1 | K2 | K3 | K4 | K5 | K6 | K7 |
| 0 | K1tap | 1 | 0 | 0 | 0 | 1 | 0 | 0 | 0 |
| 1 | K1tap | 1 | 0 | 0 | 0 | 1 | 0 | 0 | 0 |
| 2 | K3tap | 3 | 0 | 0 | 1/4 | 1/2 | 1/4 | 0 | 0 |
| 3 | K5tap | 5 | 0 | 1/16 | 1/4 | 3/8 | 1/4 | 1/16 | 0 |
| 4 | K5tap | 5 | 0 | 1/16 | 1/4 | 3/8 | 1/4 | 1/16 | 0 |
| 5 | K5tap | 5 | 0 | 1/16 | 1/4 | 3/8 | 1/4 | 1/16 | 0 |
| 6 | K3tap | 3 | 0 | 0 | 1/4 | 1/2 | 1/4 | 0 | 0 |
| 7 | K1tap | 1 | 0 | 0 | 0 | 1 | 0 | 0 | 0 |

FIG. 5C

| KSEL | KSET NAME | NUMBER OF TAPS | KSET3 | | | | | | |
|---|---|---|---|---|---|---|---|---|---|
| | | | K1 | K2 | K3 | K4 | K5 | K6 | K7 |
| 0 | K1tap | 1 | 0 | 0 | 0 | 1 | 0 | 0 | 0 |
| 1 | K3tap1 | 3 | 0 | 0 | 0 | 11/16 | 1/4 | 1/16 | 0 |
| 2 | K4tap1 | 4 | 0 | 0 | 5/16 | 3/8 | 1/4 | 1/16 | 0 |
| 3 | K5tap | 5 | 0 | 1/16 | 1/4 | 3/8 | 1/4 | 1/16 | 0 |
| 4 | K7tap | 7 | 1/64 | 3/32 | 15/64 | 5/16 | 15/64 | 3/32 | 1/64 |
| 5 | K5tap | 5 | 0 | 1/16 | 1/4 | 3/8 | 1/4 | 1/16 | 0 |
| 6 | K4tap2 | 4 | 0 | 1/16 | 1/4 | 3/8 | 5/16 | 0 | 0 |
| 7 | K3tap2 | 3 | 0 | 1/16 | 1/4 | 11/16 | 0 | 0 | 0 |

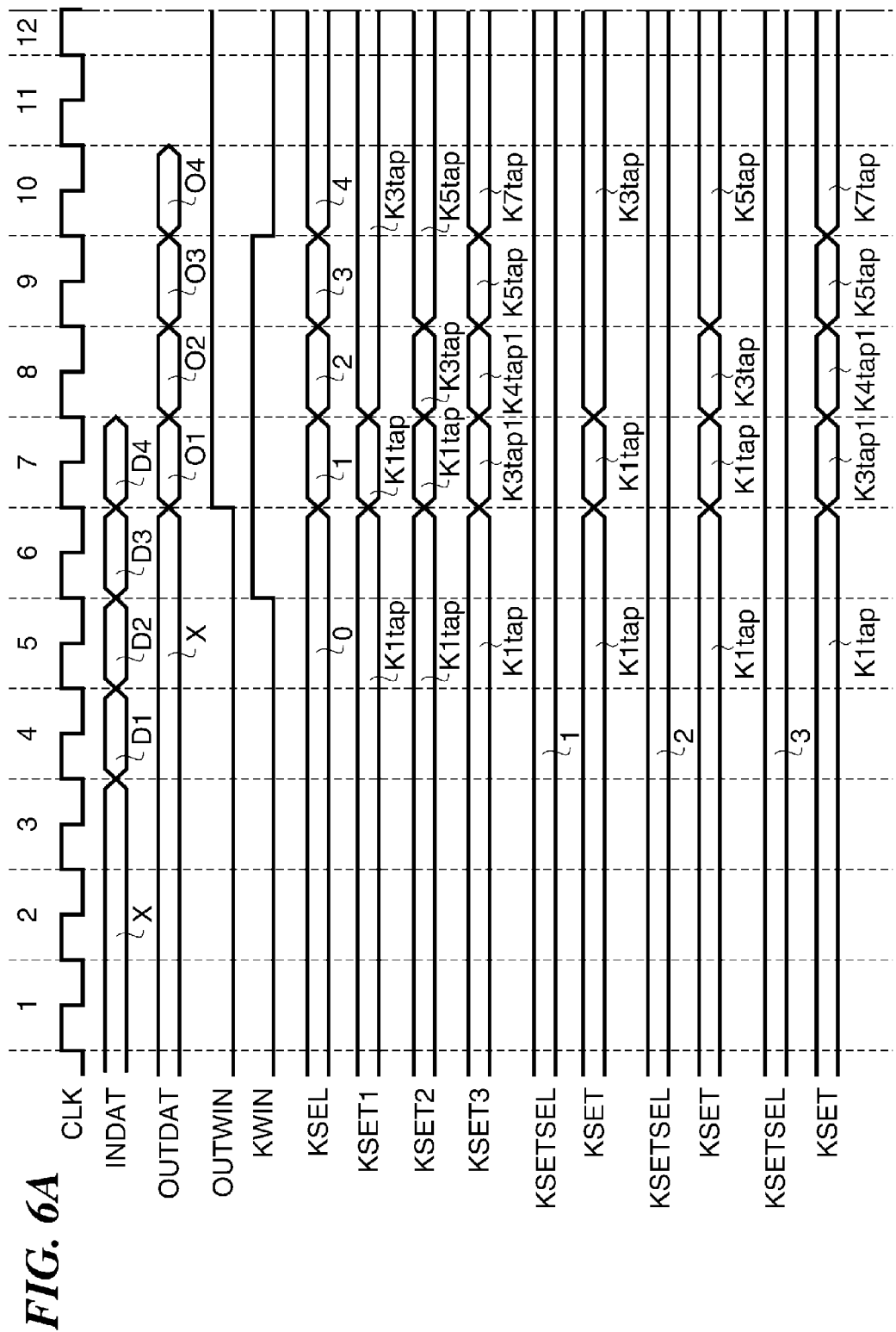

*FIG. 8A*

| ISO SENSITIVITY | KSETSELa |
|---|---|
| LESS THAN 400 | KSETSEL1 |
| EQUAL TO OR LARGER THAN 400 BUT LESS THAN 1600 | KSETSEL2 |
| EQUAL TO OR LARGER THAN 1600 | KSETSEL3 |

*FIG. 8B*

| S/N RATIO | KSETSELb |
|---|---|
| EQUAL TO OR HIGHER THAN 30 dB | KSETSEL1 |
| EQUAL TO OR HIGHER THAN 10 dB BUT LOWER THAN 30 dB | KSETSEL2 |
| LOWER THAN 10 dB | KSETSEL3 |

*FIG. 8C*

| IMAGE CHARACTERISTIC | KSETSELc |
|---|---|
| VERTICAL EDGE IMAGE | KSETSEL1 |
| OBLIQUE EDGE IMAGE | KSETSEL2 |
| HORIZONTAL EDGE IMAGE OR SOLID IMAGE | KSETSEL3 |

*FIG. 8D*

| FREQUENCY BAND | KSETSELd |
|---|---|
| HIGH-FREQUENCY BAND | KSETSEL1 |
| MIDDLE-FREQUENCY BAND | KSETSEL2 |
| LOW-FREQUENCY BAND | KSETSEL3 |

*FIG. 8E*

| PIXEL POSITION | KSETSELe |
|---|---|
| FOUR PIXELS OR MORE AWAY FROM UPPER END OR LOWER END | KSETSEL1 |
| TWO OR THREE PIXELS AWAY FROM UPPER END OR LOWER END | KSETSEL2 |
| AT UPPER END OR LOWER END | KSETSEL3 |

FIG. 11A

| | TAP NUMBER | | | | | | | | | | | FILTER COEFFICIENTS COMPUTED BY FIRST COEFFICIENT COMPUTATION METHOD | | | | | | | | | | |
|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | K1 | K2 | K3 | K4 | K5 | K6 | K7 | K8 | K9 | K10 | K11 |
| 1701 | × | × | × | × | × | ○ | ○ | ○ | ○ | ○ | ○ | 0 | 0 | 0 | 0 | 0 | 43 | 10 | 6 | 4 | 2 | 1 |
| 1702 | × | × | × | × | ○ | ○ | ○ | ○ | ○ | ○ | ○ | 0 | 0 | 0 | 0 | 23 | 20 | 10 | 6 | 4 | 2 | 1 |
| 1703 | × | × | × | ○ | ○ | ○ | ○ | ○ | ○ | ○ | ○ | 0 | 0 | 0 | 13 | 10 | 20 | 10 | 6 | 4 | 2 | 1 |
| 1704 | × | × | ○ | ○ | ○ | ○ | ○ | ○ | ○ | ○ | ○ | 0 | 0 | 7 | 6 | 10 | 20 | 10 | 6 | 4 | 2 | 1 |
| 1705 | × | ○ | ○ | ○ | ○ | ○ | ○ | ○ | ○ | ○ | ○ | 0 | 3 | 4 | 6 | 10 | 20 | 10 | 6 | 4 | 2 | 1 |
| 1706 | ○ | ○ | ○ | ○ | ○ | ○ | ○ | ○ | ○ | ○ | ○ | 1 | 2 | 4 | 6 | 10 | 20 | 10 | 6 | 4 | 2 | 1 |
| 1707 | ○ | ○ | ○ | ○ | ○ | ○ | ○ | ○ | ○ | ○ | × | 1 | 2 | 4 | 6 | 10 | 20 | 10 | 6 | 4 | 2 | 0 |
| 1708 | ○ | ○ | ○ | ○ | ○ | ○ | ○ | ○ | ○ | × | × | 1 | 2 | 4 | 6 | 10 | 20 | 10 | 6 | 4 | 3 | 0 |
| 1709 | ○ | ○ | ○ | ○ | ○ | ○ | ○ | ○ | × | × | × | 1 | 2 | 4 | 6 | 10 | 20 | 10 | 6 | 7 | 0 | 0 |
| 1710 | ○ | ○ | ○ | ○ | ○ | ○ | ○ | × | × | × | × | 1 | 2 | 4 | 6 | 10 | 20 | 23 | 13 | 0 | 0 | 0 |
| 1711 | ○ | ○ | ○ | ○ | ○ | ○ | × | × | × | × | × | 1 | 2 | 4 | 6 | 10 | 43 | 0 | 0 | 0 | 0 | 0 |

FIG. 11B

| | TAP NUMBER | | | | | | | | | | | FILTER COEFFICIENTS COMPUTED BY SECOND COEFFICIENT COMPUTATION METHOD | | | | | | | | | | |
|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | K1 | K2 | K3 | K4 | K5 | K6 | K7 | K8 | K9 | K10 | K11 |
| 1801 | × | × | × | × | × | ◎ | ○ | ○ | ○ | ○ | ○ | 0 | 0 | 0 | 0 | 0 | 43 | 10 | 6 | 4 | 2 | 1 |
| 1802 | × | × | × | × | ○ | ◎ | ○ | ○ | ○ | ○ | ○ | 0 | 0 | 0 | 0 | 20 | 23 | 10 | 6 | 4 | 2 | 1 |
| 1803 | × | × | × | ○ | ○ | ◎ | ○ | ○ | ○ | ○ | ○ | 0 | 0 | 0 | 10 | 13 | 20 | 10 | 6 | 4 | 2 | 1 |
| 1804 | × | × | ○ | ○ | ○ | ◎ | ○ | ○ | ○ | ○ | ○ | 0 | 0 | 6 | 7 | 10 | 20 | 10 | 6 | 4 | 2 | 1 |
| 1805 | × | ○ | ○ | ○ | ○ | ◎ | ○ | ○ | ○ | ○ | ○ | 0 | 3 | 4 | 6 | 10 | 20 | 10 | 6 | 4 | 2 | 1 |
| 1806 | ○ | ○ | ○ | ○ | ○ | ◎ | ○ | ○ | ○ | ○ | × | 1 | 2 | 4 | 6 | 10 | 20 | 10 | 6 | 4 | 2 | 1 |
| 1807 | ○ | ○ | ○ | ○ | ○ | ◎ | ○ | ○ | ○ | × | × | 1 | 2 | 4 | 6 | 10 | 20 | 10 | 6 | 4 | 2 | 0 |
| 1808 | ○ | ○ | ○ | ○ | ○ | ◎ | ○ | ○ | × | × | × | 1 | 2 | 4 | 6 | 10 | 20 | 10 | 7 | 4 | 3 | 0 |
| 1809 | ○ | ○ | ○ | ○ | ○ | ◎ | ○ | × | × | × | × | 1 | 2 | 4 | 6 | 10 | 20 | 10 | 10 | 6 | 0 | 0 |
| 1810 | ○ | ○ | ○ | ○ | ○ | ◎ | ○ | × | × | × | × | 1 | 2 | 4 | 6 | 10 | 20 | 13 | 20 | 0 | 0 | 0 |
| 1811 | ○ | ○ | ○ | ○ | ○ | ◎ | × | × | × | × | × | 1 | 2 | 4 | 6 | 10 | 23 | 20 | 0 | 0 | 0 | 0 |

*FIG. 15*

| FNO | FSEL1 | FSEL2 | FSEL3 |
|---|---|---|---|
| 0 | 1tap | 1tap | 1tap |
| 1 | 1tap | 1tap | 5tap |
| 2 | 3tap | 3tap | 5tap |
| 3 | 3tap | 5tap | 5tap |
| 4 | 3tap | 5tap | 7tap |
| 5 | 3tap | 5tap | 5tap |
| 6 | 3tap | 3tap | 5tap |
| 7 | 1tap | 1tap | 5tap |

FIG. 18A

| ISO SENSITIVITY | FSELSELa |
|---|---|
| LESS THAN 400 | FSELSEL1 |
| EQUAL TO OR LARGER THAN 400 BUT LESS THAN 1600 | FSELSEL2 |
| EQUAL TO OR LARGER THAN 1600 | FSELSEL3 |

FIG. 18B

| S/N RATIO | FSELSELb |
|---|---|
| EQUAL TO OR HIGHER THAN 30 dB | FSELSEL1 |
| EQUAL TO OR HIGHER THAN 10 dB BUT LOWER THAN 30 dB | FSELSEL2 |
| LOWER THAN 10 dB | FSELSEL3 |

FIG. 18C

| IMAGE CHARACTERISTIC | FSELSELc |
|---|---|
| VERTICAL EDGE IMAGE | FSELSEL1 |
| OBLIQUE EDGE IMAGE | FSELSEL2 |
| HORIZONTAL EDGE IMAGE OR SOLID IMAGE | FSELSEL3 |

FIG. 18D

| FREQUENCY BAND | FSELSELd |
|---|---|
| HIGH-FREQUENCY BAND | FSELSEL1 |
| MIDDLE-FREQUENCY BAND | FSELSEL2 |
| LOW-FREQUENCY BAND | FSELSEL3 |

FIG. 18E

| PIXEL POSITION | FSELSELe |
|---|---|
| FOUR PIXELS OR MORE AWAY FROM UPPER END OR LOWER END | FSELSEL1 |
| TWO OR THREE PIXELS AWAY FROM UPPER END OR LOWER END | FSELSEL2 |
| AT UPPER END OR LOWER END | FSELSEL3 |

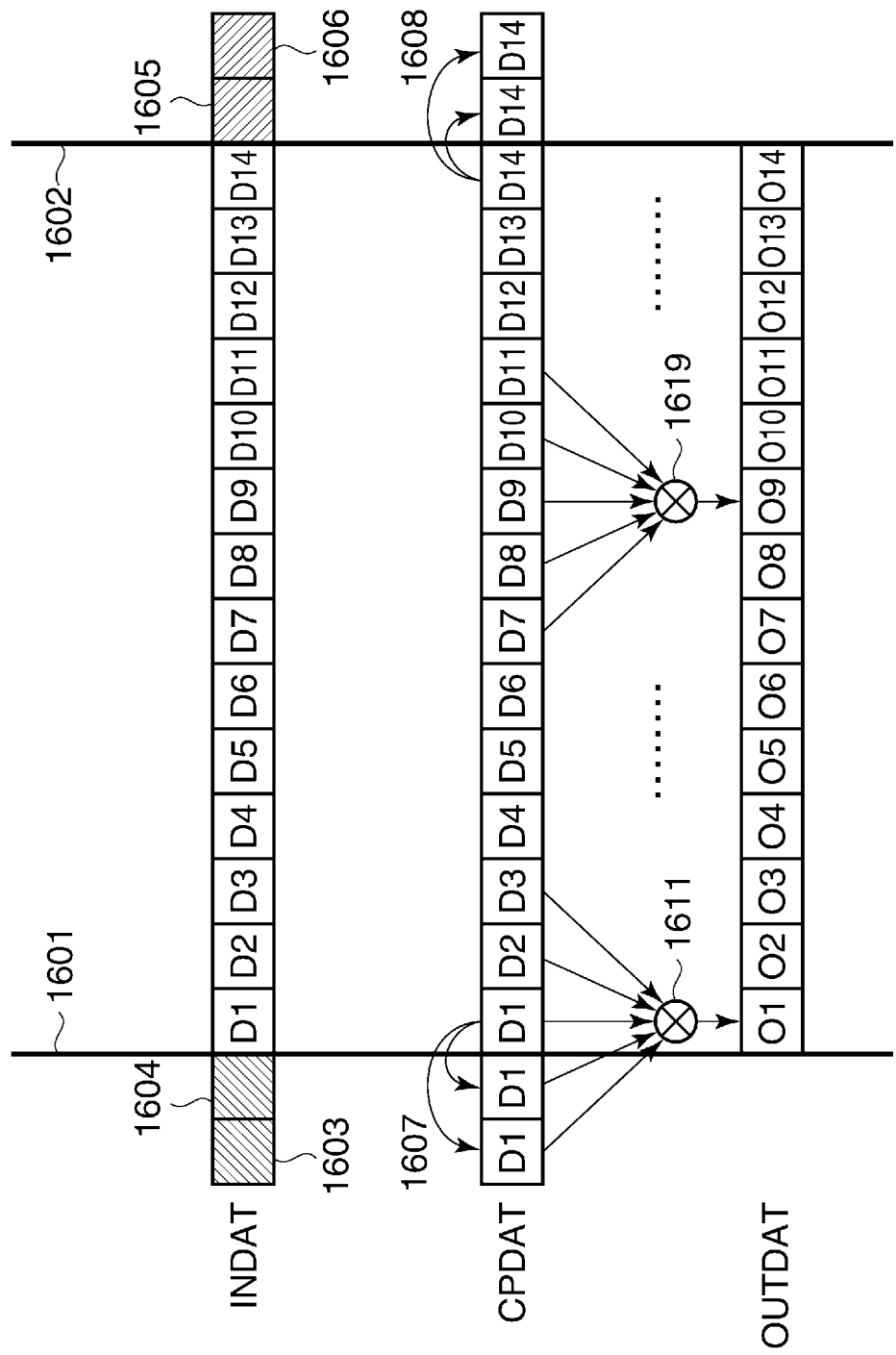

IMAGE PROCESSING APPARATUS AND METHOD CAPABLE OF SUPPRESSING IMAGE QUALITY DETERIORATION, AND STORAGE MEDIUM

BACKGROUND OF THE INVENTION

1. Field of the Invention

The present invention relates to image processing apparatus and method for performing arithmetic processing on image data on a per pixel-of-interest basis while referring to peripheral pixels, and relates to a storage medium storing a program for executing the image processing method.

2. Description of the Related Art

Image processing has conventionally been known, in which arithmetic processing is performed on image data on a per pixel-of-interest basis, while referring to peripheral pixels, by using an FIR-type digital filter or the like. FIG. 19 shows the outline of image processing for performing five-tap filter processing.

Referring to FIG. 19, input image data INDAT is constituted by pixels D1 to D14. At locations outward of image ends 1601 and 1602, there are no pixels (hereinafter, referred to as ineffective pixels). Reference numerals 1603, 1604 denote ineffective pixels which are located leftward of the image left end 1601. Reference numerals 1605, 1606 denote ineffective pixels located rightward of the image right end 1602.

Prior to executing five-tap filter processing, image data CPDAT is obtained by performing image copy 1607 to copy the pixel D1 of the input image data INDAT to positions of the ineffective pixels 1603, 1604 and by performing image copy 1608 to copy the pixel D14 of the input image data INDAT to positions of the ineffective pixels 1605, 1606.

Next, based on the image data CPDAT, five-tap filter processing is performed on each pixel of interest of the input image data INDAT. More specifically, five-tap filter processing 1611 for the pixel of interest D1 is performed based on the pixel of interest D1 and peripheral pixels (i.e., two copied pixels D1 and pixels D2, D3) to obtain a pixel O1 of output image data OUTDAT, and five-tap filter processing for the pixel of interest D2 is performed based on the pixel of interest D2 and peripheral pixels (i.e., copied pixel D1 and pixels D1, D3, and D4) to obtain a pixel O2 of the output image data OUTDAT. Further, five-tap filter processing for each of pixels of interest D3 to D14 is performed to obtain each of pixels O3 to O14 of the output image data OUTDAT. Reference numeral 1619 denotes five-tap filter processing for the pixel of interest D9.

FIG. 20 shows in block diagram an example construction of a conventional image processing apparatus.

As shown in FIG. 20, the image processing apparatus includes a pixel copy unit 201 that copies image end pixels, an image processor 202 that performs image processing such as filter processing, and a region information controller 203 that controls image region position information. In accordance with image left end copy region information COPYLWIN and image right end copy region information COPYRWIN which are supplied from the region information controller 203, the pixel copy unit 201 copies image end pixels of the input image data INDAT to positions of ineffective pixels of the input image data INDAT, thereby generating image data CPDAT. The image processor 202 performs filter processing on the image data CPDAT supplied from the pixel copy unit 201, and generates output image data OUTDAT based on the filter-processed image data CPDAT in accordance with output image region information OUTWIN supplied from the region information controller 203.

FIG. 21 shows a timing chart of input and output signals in the image processing apparatus of FIG. 20. In the illustrated example, clock signals are numbered consecutively beginning from 1 and referred to as clocks 1, 2, 3, and so on.

Referring to FIG. 21, the pixel copy unit 201 of the image processing apparatus sequentially inputs the pixels D1 to Dn (=D14) (illustration of which is partly omitted) of the input image data INDAT at clocks 4 to 17, inputs the image left end copy region information COPYLWIN at clocks 4 and 5, and copies the pixel D1 at clocks 5 and 6. The pixel copy unit 201 inputs the image right end copy region information COPYRWIN at clocks 20 and 21, and copies the pixel Dn at clocks 21 and 22. At clocks 5 to 22, the pixel copy unit 201 sequentially outputs the pixels D1, D1, D1, D2 to Dn, Dn, and Dn of the image data CPDAT.

The image processor 202 inputs the image data CPDAT and the output image region information OUTWIN, and sequentially outputs the pixels O1 to On (=O14) of the output image data OUTDAT at clocks 9 to 22.

FIR filter processing similar to that described above is proposed in Japanese Laid-open Patent Publication No. H08-138045.

With the above-described conventional image processing and with the filter processing disclosed in Japanese Laid-open Patent Publication No. H08-138045, in a case that image processing is performed while referring to peripheral pixels, pixels at image ends are copied to prevent image end parts of an output image from having undefined values. However, there is a fear that image quality in vicinity of image ends is deteriorated since the same image processing is performed at the image ends as that performed at other image regions.

Also proposed is filter processing where a deblocking filter is used to eliminate a problem that a generated image has a block-like appearance due to a difference in pixel values of adjacent blocks (ITU-T H.264 written standards). With this proposed filter processing, however, there is a fear that image quality in vicinity of image ends of an output image is deteriorated since no effective image region is taken into account in image processing performed at image ends of input image data.

SUMMARY OF THE INVENTION

The present invention provides image processing apparatus and method and a storage medium, which are capable of suppressing image quality deterioration in an output image region determined based on reference pixel regions including image ends.

According to one aspect of this invention, there is provided an image processing apparatus having an image processing unit that performs arithmetic processing on image data on a per pixel of interest basis while referring to peripheral pixels, which comprises a region information control unit configured to control image region information, a coefficient selection value generation unit configured to generate a coefficient selection value based on the image region information supplied from the region information control unit, a table unit having coefficient tables configured to output coefficient sets, which are different from one another, in accordance with the coefficient selection value generated by the coefficient selection value generation unit, a coefficient set selection unit configured to generate a coefficient set selection value, and a table selection unit configured to select one of the coefficient tables in accordance with the coefficient set selection value generated by the coefficient set selection unit, wherein the image processing unit performs arithmetic processing on the image data by using coefficients that constitute the coefficient set output from the coefficient table selected by the table selection unit.

With this invention, image processing can properly be performed even in vicinity of image ends based on reference pixels determined by taking account of effective pixels, whereby image quality deterioration in the output image region determined based on reference pixel regions including image ends can be suppressed to a minimum.

Further features of the present invention will become apparent from the following description of exemplary embodiments with reference to the attached drawings.

BRIEF DESCRIPTION OF THE DRAWINGS

FIGS. 5A to 5C are views showing an example of setting contents of the first to third coefficient tables;

FIGS. 6A and 6B are a timing chart of input and output signals in the image processing apparatus;

FIGS. 8A to 8E are views showing example tables that are referred to by a coefficient set decision unit of the coefficient set selection unit to determine a coefficient set selection value;

FIG. 11A is table showing an example of filter coefficients computed by the first coefficient computation method;

FIG. 11B is table showing an example of filter coefficients computed by a second coefficient computation method;

FIG. 15 is a view collectively showing an example of contents of first to third filter selection tables of a filter selection table unit shown in FIG. 14;

FIGS. 18A to 18E are views showing example tables referred to by a filter selection value decision unit of the filter selection value controller to determine a filter selection value control signal;

FIG. 19 is a view showing the outline of image processing in which five-tap filter processing is performed;

DESCRIPTION OF THE EMBODIMENTS

The present invention will now be described in detail below with reference to the drawings showing preferred embodiments thereof.

First Embodiment

Figure 1:
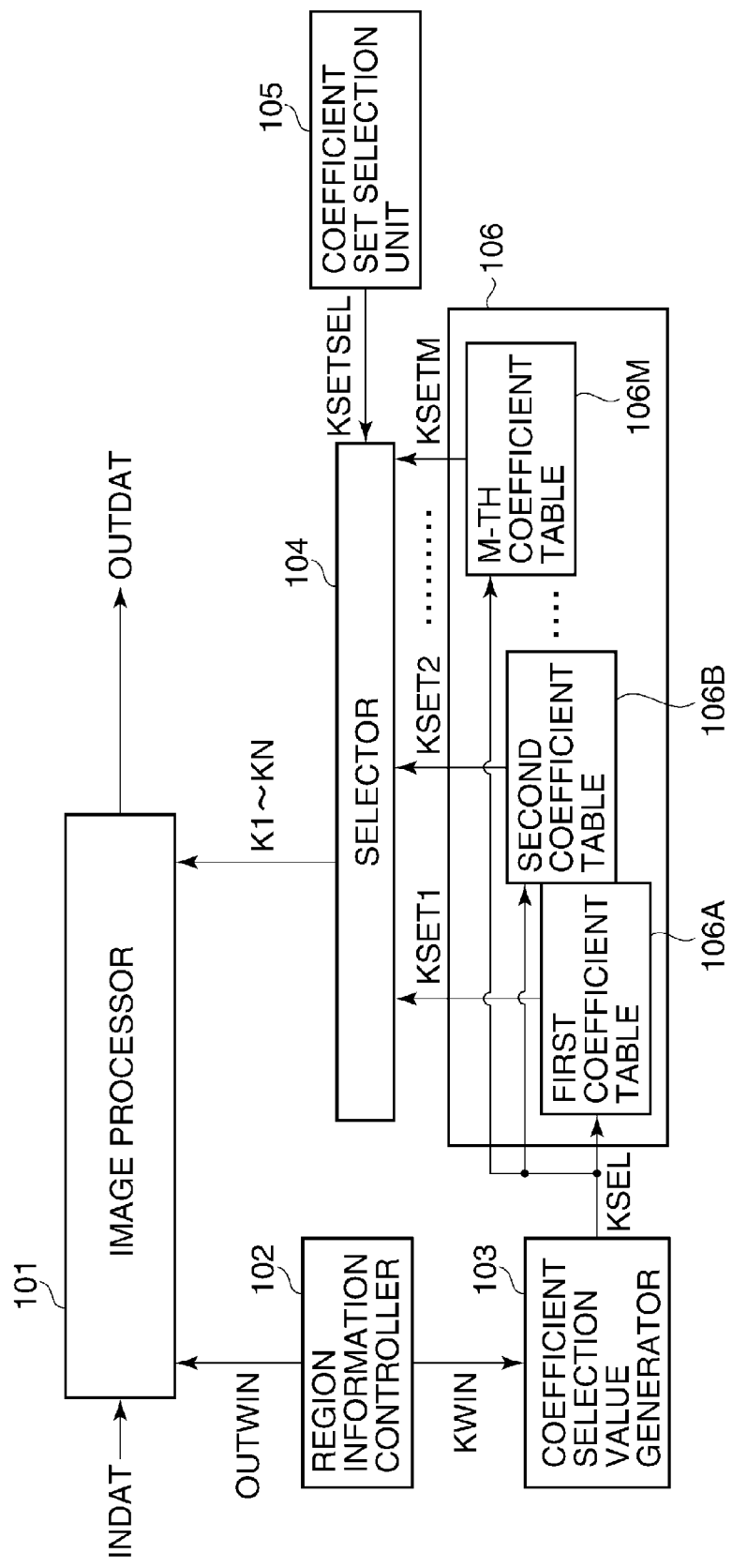
FIG. 1 is a block diagram showing an example construction of an image processing apparatus according to a first embodiment of this invention.
Figure 2:
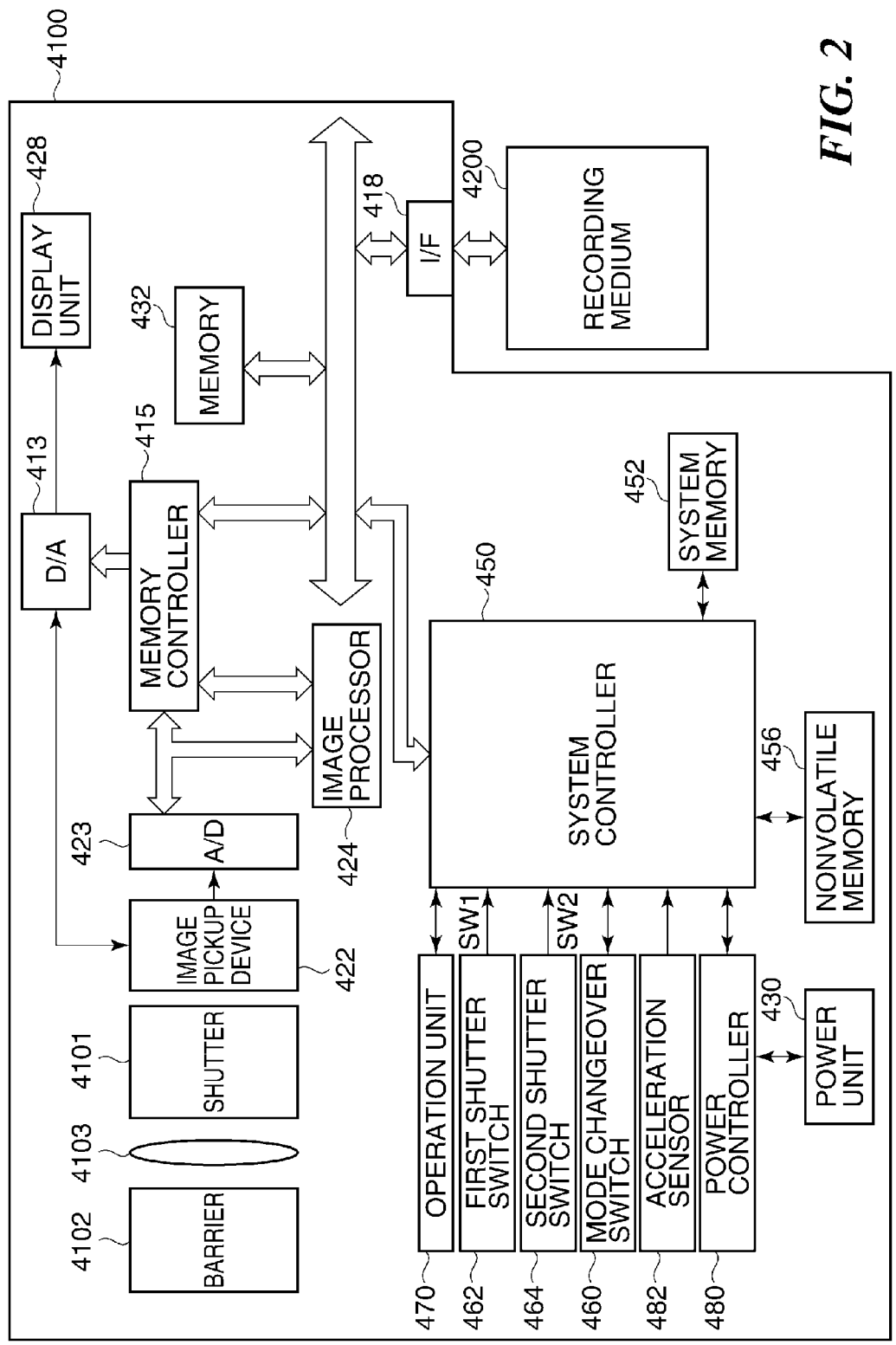
FIG. 2 is a block diagram showing an example construction of an image pickup apparatus mounted with the image processing apparatus shown in FIG. 1.

FIG. 2 shows in block diagram an example construction of an image pickup apparatus mounted with an image processing apparatus according to a first embodiment of this invention. The details of the image processing apparatus will be described later referring to FIG. 1.

As shown in FIG. 2, the image pickup apparatus 4100 includes a taking lens 4103 including a focus lens, a shutter 4101 having an aperture function, and an image pickup device 422 implemented by, e.g., a CCD or CMOS device that converts an optical image into an electrical signal.

Reference numeral 4102 denotes a barrier that covers an image pickup system including the taking lens 4103, shutter 4101, and image pickup device 422, thereby preventing contamination and damage of the image pickup system. Reference numeral 423 denotes an A/D converter that converts an analog signal output from the image pickup device 422 into a digital signal.

Reference numeral 424 denotes an image processor of the image pickup apparatus 4100. The image processor 424 is implemented by the image processing apparatus shown in FIG. 1, and performs color conversion processing and resizing processing (such as pixel interpolation and reduction) on data supplied from the A/D converter 423 or from a memory controller 415. The image processor 424 performs image processing (whose contents are determined according to photographing condition, image characteristic, etc.) on input image data such as a photographed image, thereby generating record image data for output.

Based on results of calculations on picked-up image data by the image processor 424, a system controller 450 executes exposure control and distance measurement control for TTL-AF (through-the-lens auto-focus) processing, AE (automatic exposure) processing, EF (electronic flash) processing, and TTL-AWB (through-the-lens auto-white balance) processing.

The output data from the A/D converter 423 is written into a memory 432 via the image processor 424 and the memory controller 415 or via the memory controller 415. The memory 432 stores image data, which is obtained by the image pickup device 422 and converted into digital data by the A/D converter 423. The memory 432 also functions as a video memory that stores image data to be displayed on a display unit 428, and has a storage capacity large enough to store a desired number of still images and/or a moving image of predetermined time length and/or audio data of predetermined time length.

Reference numeral 413 denotes a D/A converter that converts image display data stored in the memory 432 into an analog signal and supplies the analog signal to the display unit 428. Based on the analog signal supplied from the D/A converter 413, display is made on a display device (such as LCD) of the display unit 428.

A nonvolatile memory 456 is implemented by an electrically erasable and recordable memory (e.g., an EEPROM) that stores constants, programs, etc. for use by the system controller 450 for its operation.

The system controller 450 controls the entire image pickup apparatus 4100, and executes a program stored in the nonvolatile memory 456 to perform a coefficient computation process (described later). Reference numeral 452 denotes a system memory implemented by, e.g., a RAM, which is used to store, e.g., constants and variables for use by the system controller 450 for its operation and to develop, e.g., a program read from the nonvolatile memory 456. The system controller 450 performs display control by controlling the memory 432, D/A converter 413, display unit 428, etc.

An acceleration sensor 482 detects an acceleration applied to the image pickup apparatus 4100. Acceleration detection information can be used in the coefficient computation process.

A mode changeover switch 460, first and second shutter switches 462, 464, and an operation unit 470 are used to input operation instructions to the system controller 450.

The mode changeover switch 460 is operable by a user to give an instruction to change the operation mode of the system controller 450 between a still image recording mode, moving image recording mode, reproduction mode, etc. The first shutter switch 462 is switched on to output to the system controller 450 a first shutter switch signal SW1 when a shutter button (not shown) of the image pickup apparatus 4100 is half-pressed to give a photographing preparation instruction. In response to the first shutter switch signal SW1, the system controller 450 starts AF processing, AE processing, AWB processing, EF processing, etc.

The second shutter switch 464 is switched on to output to the system controller 450 a second shutter switch signal SW2 when the shutter button is fully pressed to give a photographing instruction. In response to the second shutter switch signal SW2, the system controller 50 starts a series of photographing processes from signal reading from the image pickup device 422 to image data writing to a recording medium 4200.

The operation unit 470 acts as function buttons each of which assigns a function suitable for scene when a corresponding one of function icons displayed on the display unit 428 is selectively operated by the user. The function buttons include an end button, return button, image shift button, jump button, aperture step-down button, attribute change button, etc. When a menu button is pressed, a menu screen for various settings is displayed on the display unit 428. The user is able to intuitively carry out settings by using the menu screen displayed on the display unit 428, a four-direction button, and a SET button, which are not shown.

Reference numeral 480 denotes a power controller that includes a battery detection circuit, a DC-DC converter, a switch circuit for selecting blocks of the image pickup apparatus to be supplied with electric power, etc., and detects battery attachment/detachment, battery type, and battery residual capacity. In accordance with detection results and an instruction from the system controller 450, the power controller 480 controls the DC-DC converter (not shown) so as to supply desired voltages to various parts of the image pickup apparatus 4100 for desired time periods.

Reference numeral 430 denotes a power unit that is implemented by a primary battery such as an alkaline battery or a lithium battery, or a secondary battery such as a NiCd battery, NiMH battery or Li battery, or an AC adapter. Reference numeral 418 denotes an interface with the recording medium 4200. The recording medium 4200 is a memory card or the like, which is implemented by, e.g., a semiconductor memory or a magnetic disk.

FIG. 1 shows in block diagram an example construction of the image processing apparatus that constitutes the image processor 424 of the image pickup apparatus 4100 shown in FIG. 2.

In FIG. 1, reference numeral 101 denotes an image processor that generates output image data OUTDAT from input image data INDAT and outputs the generated data OUTDAT. Reference numeral 102 denotes a region information controller that controls image region information. The region information controller 102 outputs an image output region control signal OUTWIN to the image processor 101, and outputs a filter coefficient changeover control signal KWIN to a coefficient selection value generator 103. Specifically, the image region information includes the control signals OUTWIN and KWIN.

The coefficient selection value generator 103 generates a coefficient selection value KSEL in accordance with the control signal KWIN supplied from the region information controller 102. A coefficient table unit 106 has first to M-th coefficient tables 106A to 106M, and outputs first to M-th filter coefficient sets KSET1 to KSETM in accordance with the coefficient selection value KSEL.

A coefficient set selection unit 105 generates a coefficient set selection value KSETSEL and outputs the generated value KSETSEL to a selector 104, which is implemented by, e.g., an MUX. The selector 104 selects one of the first to M-th filter coefficient sets KSET1 to KSETM (which are input from the coefficient table unit 106) in accordance with the coefficient set selection value KSETSEL input from the coefficient set selection unit 105, and outputs filter coefficients K1 to KN constituting the selected filter coefficient set to the image processor 101.

Figure 3:
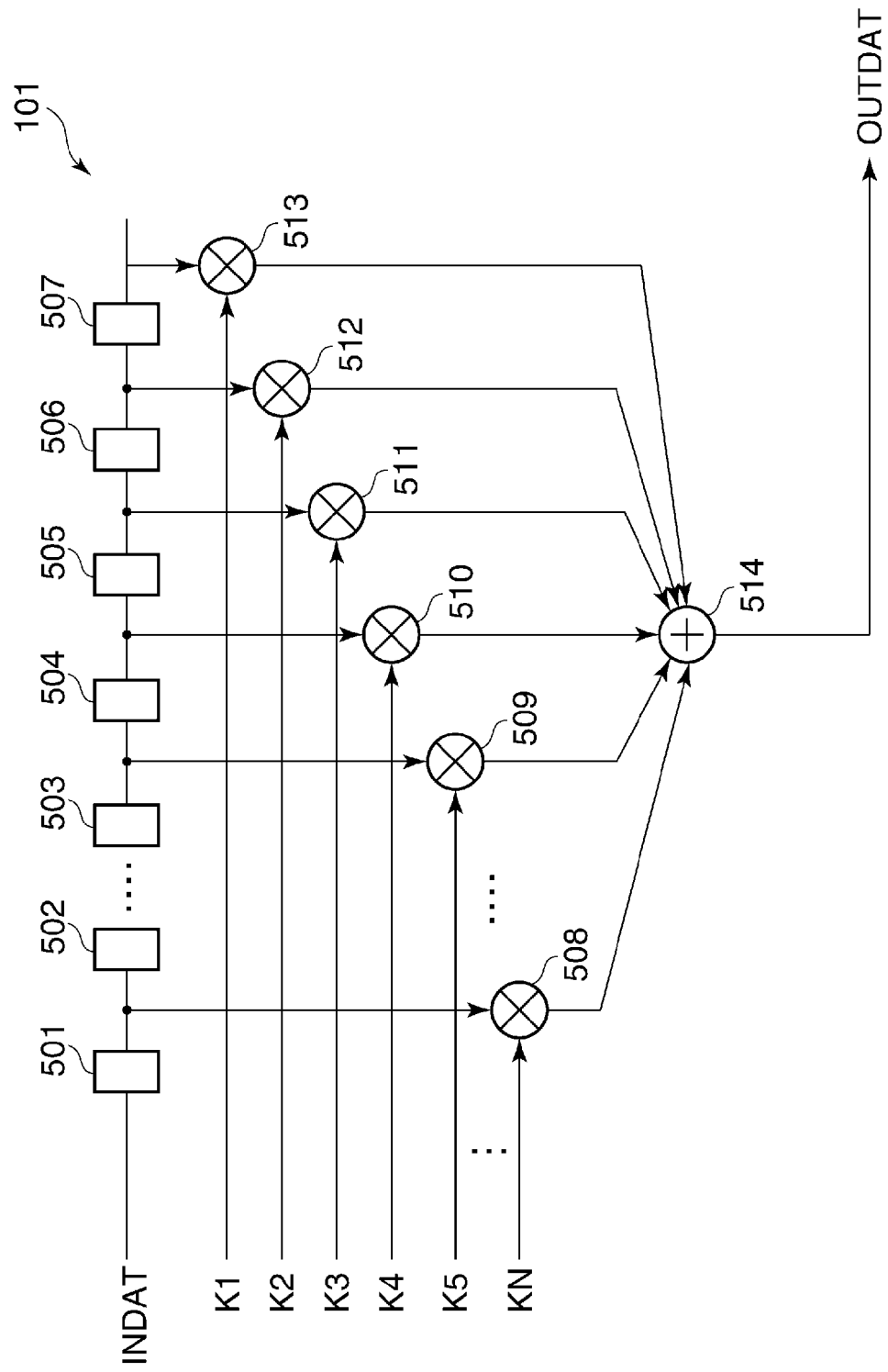
FIG. 3 is a view showing an internal construction of an image processor of the image processing apparatus.

FIG. 3 shows an internal construction of the image processor 101.

The image processor 101 is implemented by, e.g., an FIR filter, and includes D flip-flops (hereinafter, referred to as the D-FFs) 501 to 507 which are delay elements for holding and shifting pixel values of input image data INDAT in synchronism with internal clock, multipliers 508 to 513 that multiply outputs from the D-FFs 501 to 507 by filter coefficients KN to K1, respectively, and an adder 514 that adds together outputs from the multipliers 508 to 513 and outputs an addition result as output image data OUTDAT.

Figure 4:
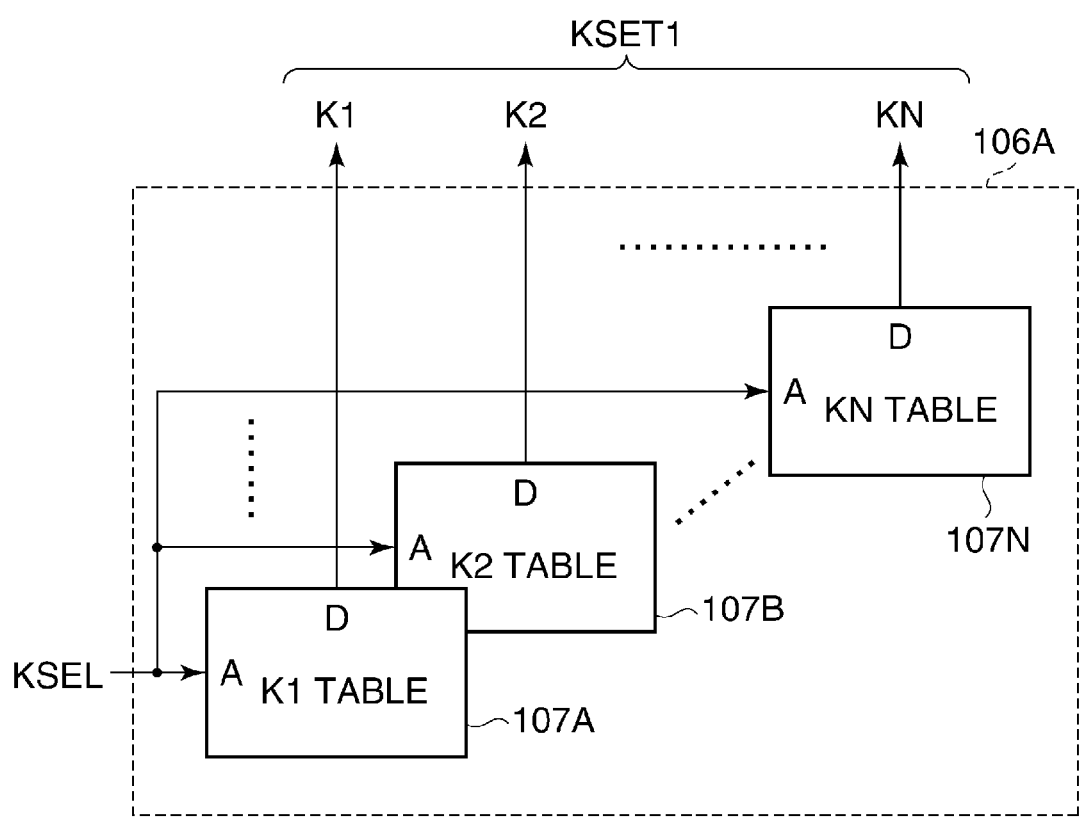
FIG. 4 is a view showing an internal construction of a first coefficient table of the image processing apparatus.

FIG. 4 shows an internal construction of the first coefficient table 106A.

The first coefficient table 106A includes a K1 table 107A to a KN table 107N for outputting filter coefficients K1 to KN, respectively, in accordance with the coefficient selection value KSEL supplied from the coefficient selection value generator 103, and outputs the first filter coefficient set KSET1 including the filter coefficients K1 to KN. The second to M-th coefficient tables 106B to 106M each have the same construction as the first coefficient table 106A, and respectively output the second to M-th filter coefficient sets KSET2 to KSETM (each including the coefficients K1 to KN) in accordance with the coefficient selection value KSEL.

FIGS. 5A to 5C show an example of setting contents of the first to third coefficient tables 106A to 106C.

As shown in FIG. 5A, the first coefficient table 106A has eight rows corresponding to respective ones of eight coefficient selection values KSEL (0 to 7). Each row of the first coefficient table 106A has a KSEL field set with a value (e.g., 0) corresponding to one of the eight coefficient selection values KSEL, a KSET name field set with a name of filter coefficient set KSET1 (e.g., K1tap), a number-of-taps field set with the number of taps (e.g., 1), and fields of K1 to K7 which are respectively set with values of filter coefficients K1 to K7 (e.g., 0, 0, 0, 1, 0, 0, 0) that constitute the filter coefficient set KSET1.

As with the first coefficient table 106A, each of the second and third coefficient tables 106B and 106C has eight rows each having a KSEL filed, a KSET name filed, a number-of-taps filed, and fields of K1 to K7. The second coefficient table 106B relates to the second coefficient set KSET2, and the third coefficient table 106C relates to the third coefficient set KSET3.

Figure 6B:
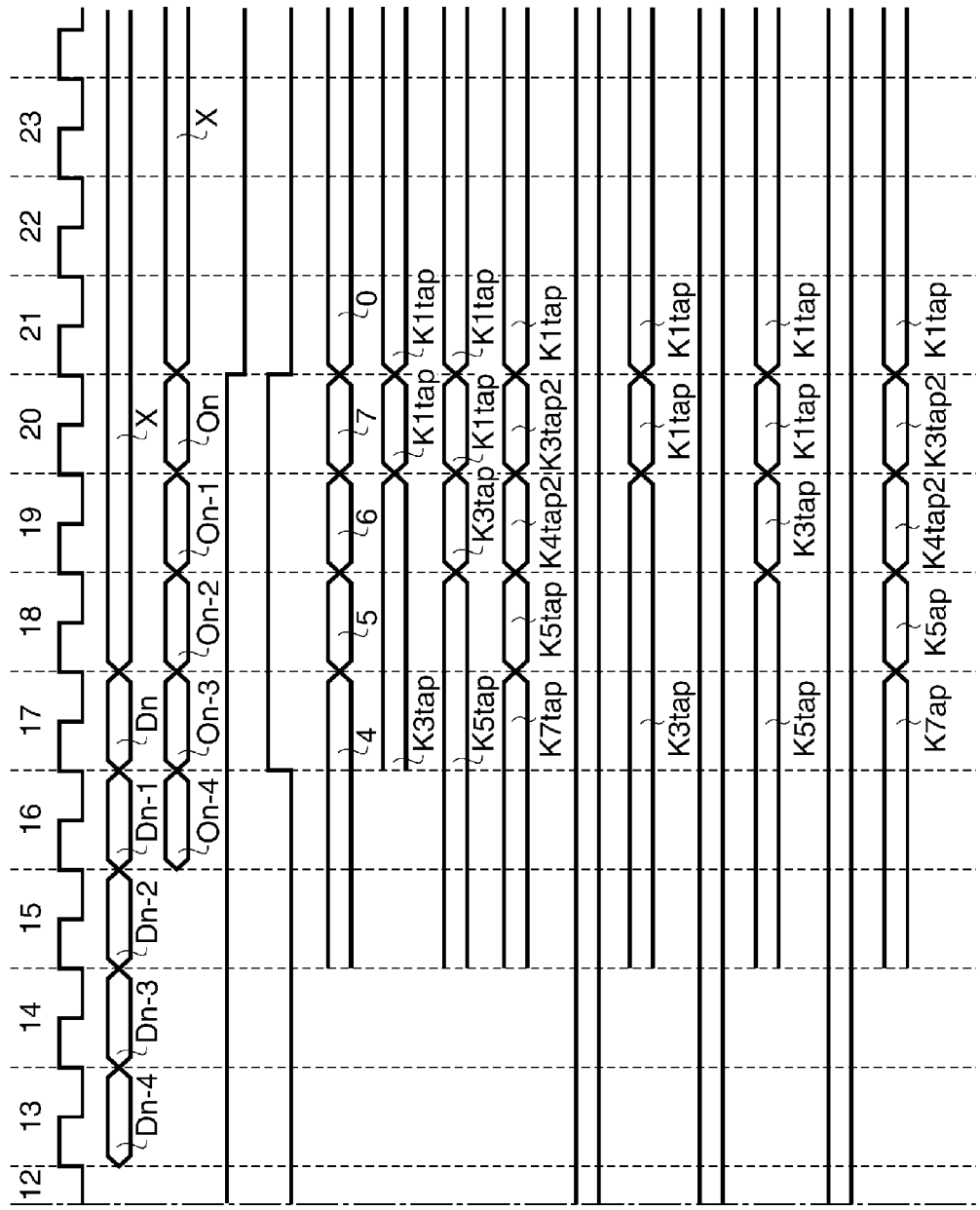

FIGS. 6A and 6B are a timing chart of input and output signals in the image processing apparatus shown in FIG. 1.

The image processing apparatus performs image processing on a per pixel basis in accordance with sync clock signals CLK. In the illustrated example, the clock signals CLK are numbered consecutively beginning from 1 and referred to as clocks 1, 2, 3, and so on.

The image processing apparatus inputs the input image data INDAT one pixel by one pixel in accordance with the clock signals CLK. At clocks 1 to 3 and at and after clock 18, no effective pixel values of the input image data INDAT are input to the image processing apparatus (as shown by undefined values X). At clocks 4 to 17, effective pixel values D1 to Dn (whose illustration is partly omitted) of the input image data INDAT are sequentially input to the image processing apparatus. Symbol D1 represents a pixel value at the image left end, and Dn (=D14) represents a pixel value at the image right end.

An output image region of the output image data OUTDAT is controlled in accordance with an output image region control signal OUTWIN that becomes an H level for a time period corresponding to the effective pixel region of the input image data INDAT. By setting the output image region based on the H level time period of the control signal OUTWIN, the output image region can be controlled properly so as to correspond to the effective pixel region of the input image data INDAT.

During the H level time period of the control signal OUTWIN, pixel values O1 to On of the output image data OUTDAT are sequentially output at clocks 7 to 20. Symbol O1 represents the pixel value at the left end of the output image, and On (=O14) represents the pixel value at the right end of the output image.

The coefficient selection value KSEL is controlled based on the filter coefficient changeover control signal KWIN output from the coefficient selection value generator 103. In this embodiment, the coefficient selection value KSEL can vary from an initial value of 0 to a maximum value of 7, and is incremented by one at a clock next to a clock where the control signal KWIN is at H level. Specifically, the coefficient selection value KSEL is at the initial value of 0 at clocks 1 to 6, is incremented by one at each clock to assume from a value of 1 to a value of 4 at clocks 7 to 10, and is maintained at a value of 4 at clocks 11 to 17. Then, the coefficient selection value KSEL is incremented by one at each clock to assume from a value of 5 to a value of 7 at clocks 18 to 20, and returns to the initial value of 0 at clock 21.

The first to third coefficient sets KSET1 to KSET3 are respectively output from the first to third coefficient tables 106A to 106C shown in FIGS. 5A to 5C in accordance with the coefficient selection value KSEL.

The following is a description of the first coefficient set KSET1. At clocks 1 to 7, the coefficient selection value KSEL has a value of 0 or 1 and therefore the coefficient set KSET1 corresponding to the KSET name of K1tap is output. At clocks 8 to 19, the coefficient selection value KSEL has a corresponding one of values 2 to 6 and hence the coefficient set KSET1 corresponding to the KSET name of K3tap is output. At or after clock 20, the coefficient selection value KSEL has a value of 7 or 0, so that the coefficient set KSET1 corresponding to the KSET name of K1tap is output.

Next, a description of the second coefficient set KSET2 is given. At clocks 1 to 7, the coefficient set KSET2 corresponding to the KSET name of K1tap is output. At clock 8, the coefficient set KSET2 corresponding to the KSET name of K3tap is output. At clocks 9 to 18, the coefficient set KSET2 corresponding to the KSET name of K5tap is output. At clock 19, the coefficient set KSET2 corresponding to the KSET name of K3tap is output. At and after clock 20, the coefficient set KSET2 corresponding to the KSET name of K1tap is output.

Next, a description of the third coefficient set KSET3 is given. At clocks 1 to 6, the coefficient set KSET3 corresponding to the KSET name of K1tap is output. At clocks 7 to 9, the coefficient set KSET3 corresponding to the KSET name of K3tap1, K4tap1, or K5tap is output. At clocks 10 to 17, the coefficient set KSET3 corresponding to the KSET name of K7tap is output. At clocks 18 to 20, the coefficient set KSET3 corresponding to the KSET name of K5tap, K4tap2, or K3tap2 is output. At and after clock 21, the coefficient set KSET3 corresponding to the KSET name of K1tap is output.

The selector 104 selects the first filter coefficient set KSET1 when the coefficient set selection value KSETSEL has a value of 1, selects the second filter coefficient set KSET2 when the coefficient set selection value KSETSEL has a value of 2, and selects the third filter coefficient set KSET3 when the coefficient set selection value KSETSEL has a value of 3. The selector 104 outputs the selected filter coefficient set KSET1, KSET2, or KSET3 as the filter coefficient set KSET.

Figure 7:
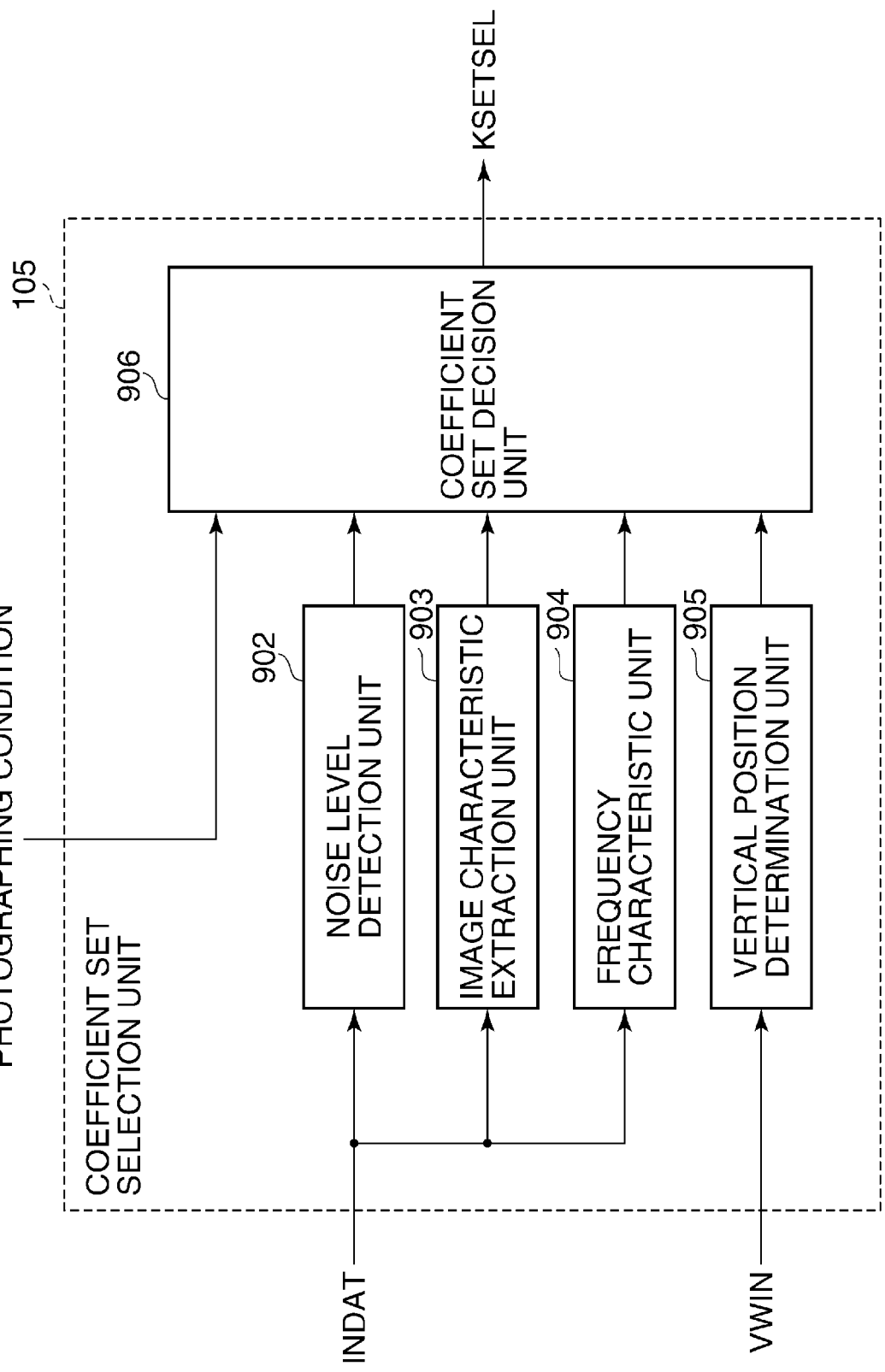
FIG. 7 is a view showing an internal construction of a coefficient set selection unit of the image processing apparatus.

FIG. 7 shows an internal construction of the coefficient set selection unit 105 shown in FIG. 1.

In FIG. 7, reference numeral 902 denotes a noise level detection unit that detects for output a noise level (S/N ratio) from the input image data INDAT. Reference numeral 903 denotes an image characteristic extraction unit that extracts an image characteristic such as edge (especially, edge direction) or solid image (which is an image having an image-area ratio larger than, e.g., 90%) from the input image data INDAT, and outputs the extracted image characteristic. Reference numeral 904 denotes a frequency characteristic unit that detects a frequency characteristic of the input image data INDAT, and outputs information representing a frequency band.

Reference numeral 905 denotes a vertical position determination unit that determines distance information representing a distance from a vertical image end based on a vertical image region control signal VWIN, and outputs the distance information. It is assumed here that horizontal image processing is performed by the vertical position determination unit 905. In the case of performing vertical image processing, a horizontal position determination unit (not shown) alternative to the vertical position determination unit 905 determines distance information representing a distance from a horizontal image end based on a horizontal image region control signal (not shown), and outputs the distance information.

Reference numeral 906 denotes a coefficient set decision unit that determines for output the coefficient set selection value KSETSEL based on a photographing condition indicated in the image data, a noise level detected from the image data, an image characteristic extracted from the image data, a frequency band detected from the image data, and distance information representing a distance between the pixel of interest and an image end.

FIGS. 8A to 8E show example tables that are referred to by the coefficient set decision unit 906 to determine the coefficient set selection value KSETSEL.

FIG. 8A shows a table indicating a relation between photographing condition (ISO sensitivity in this example) and first coefficient set selection value KSETSELa. In the illustrated example, the first coefficient set selection value KSETSELa is set to a value of KSETSEL1 when the ISO sensitivity has a value less than 400, is set to a value of KSETSEL2 when the ISO sensitivity has a value equal to or larger than 400 but less than 1600, and is set to a value of KSETSEL3 when the ISO sensitivity has a value equal to or larger than 1600. The value of KSETSEL 1 is smaller than the value of KSETSEL2, which is smaller than the value of KSETSEL3. The photographing condition is not limited to ISO sensitivity, but may be, e.g., a TV value determined depending on shutter speed.

FIG. 8B shows a table indicating a relation between noise level (S/N ratio in this example) and second coefficient set selection value KSETSELb. The S/N ratio is a value representing the magnitude of a signal level relative to noise level. The second coefficient set selection value KSETSELb is set to a value of KSETSEL1 when the S/N ratio is equal to or higher than 30 dB, is set to a value of KSETSEL2 when the S/N ratio is equal to or larger than 10 dB but lower than 30 dB, and is set to a value of KSETSEL3 when the S/N ratio is lower than 10 dB.

FIG. 8C shows a table indicating a relation between image characteristic and third coefficient set selection value KSETSELc. The third coefficient set selection value KSETSELc is set to a value of KSETSEL1 when the image characteristic corresponds to a vertical edge image, is set to a value of KSETSEL2 when the image characteristic corresponds to an oblique edge image, and is set to a value of KSETSEL3 when the image characteristic corresponds to a horizontal edge image or a solid image. In this example, a case has been described in which horizontal image processing is performed. In the case of vertical image processing, values of KSETSEL1, KSETSEL2, and KSETSEL3 are used for a horizontal edge image, an oblique edge image, and a vertical edge image, respectively.

FIG. 8D shows a table indicating a relation between frequency characteristic (image frequency band in this example) and fourth coefficient set selection value KSETSELd. The fourth coefficient set selection value KSETSELd is set to a value of KSETSEL1 for a high-frequency band image, is set to a value of KSETSEL2 for a middle-frequency band image, and is set to a value of KSETSEL3 for a low-frequency band image.

FIG. 8E shows a table indicating a relation between position of a pixel of interest (which is an image processing object) from image end and fifth coefficient set selection value KSETSELe. The fifth coefficient set selection value KSETSELe is set to a value of KSETSEL1 when the pixel of interest is located four pixels or more away from the image end (upper end or lower end in this example), set to a value of KSETSEL2 when the pixel of interest is located two or three pixels away from the image end, and set to a value of KSETSEL3 when the pixel of interest is located at the image end. In this example, a case has been described where horizontal image processing is performed. In the case of vertical image processing, the values of KSETSEL1, KSETSEL2, and KSETSEL3 are used in this order with decrease of the distance between the pixel-of-interest position and the image left or right end.

The coefficient set decision unit 906 determines the coefficient set selection value KSETSEL from the first to fifth coefficient set selection values KSETSELa to KSETSELe decided based on the tables shown in FIGS. 8A to 8E. For example, a maximum value of the first to fifth coefficient set selection values KSETSELa to KSETSELe can be determined as the coefficient set selection value KSETSEL.

In the following, a description will be given of how filter coefficients K1 to KN are computed.

Figure 9:
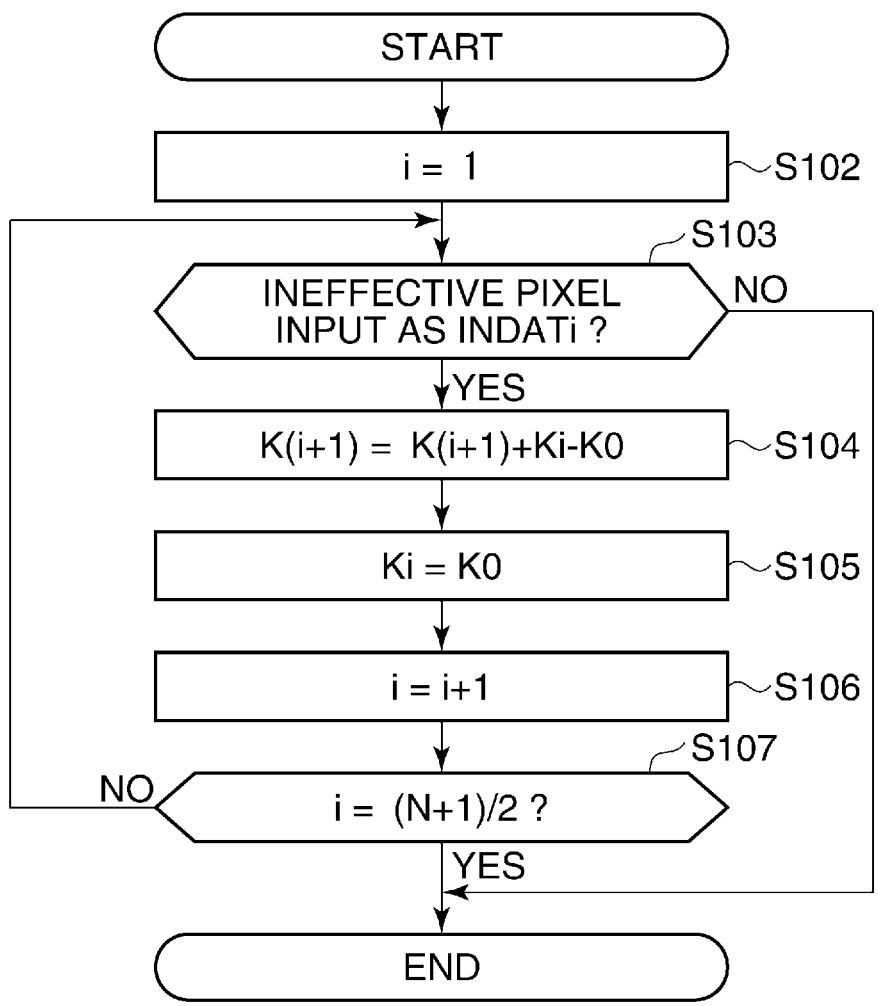
FIG. 9 is a flowchart showing procedures of a process for computing filter coefficients for image data on the image left end side according to a first coefficient computation method.

FIG. 9 shows in flowchart the procedures of a process for computing filter coefficients for image data on the image left end side according to a first coefficient computation method. It is assumed in the following description that the filter coefficient computation process is executed by the CPU of the image processing apparatus, but this is not limitative.

In this example, it is assumed that the filter coefficients K1 to KN for an image central region (e.g., a region shown by reference numeral 1706 in FIG. 11A and located between a sixth pixel counted from the image left end and a sixth pixel counted from the image right end) are determined in advance. Filter coefficients for image data on the image end side, which are used when an ineffective pixel is included in peripheral pixels that are referred to for calculation of an output image pixel corresponding to a pixel of interest, are computed according to the pixel-of-interest position relative to the image end.

More specifically, based on the filter coefficients K1 to KN for the image central region, filter coefficients K1 to KN for use when the pixel of interest is at a position at which only the leftmost pixel among tap processing object pixels (i.e., pixels to be subjected to tap processing) is an ineffective pixel are first computed according to the below-described procedures of a filter coefficient computation process. Next, based on the immediately preceding computed filter coefficients K1 to KN (i.e., filter coefficients K1 to KN computed for the pixel-of-interest position at which ineffective pixels included in a reference pixel region are smaller by one in number than those included in a reference pixel region for the present filter coefficient computation), filter coefficients K1 to KN for use when the pixel of interest is at a position at which the leftmost pixel and its neighboring inside pixel alone among the tap processing object pixels are ineffective pixels are computed in the same procedures. Such filter coefficient computation is repeated until filter coefficients K1 to KN for use when the pixel of interest is at a position at which all the pixels located on the left side of the pixel of interest among the tap processing object pixels are ineffective pixels are computed.

The above also applies to a process for computing filter coefficients for image data on the image right end according to the first coefficient computation method, a process for computing filter coefficients for image data on the image left end according to a second coefficient computation method, and a process for computing filter coefficients for image data on the image right end according to the second coefficient computation method, which will be described later with reference to FIGS. 10, 12, and 13, respectively.

In the filter coefficient computation process executed at each pixel-of-interest position, the CPU of the image processing apparatus initializes an input pixel position index i to a value of 1 corresponding to a first tap (step S102), and determines whether or not an input pixel IDATi is an ineffective pixel (step S103). If it is determined that the input pixel IDATi is not an ineffective pixel, the present process is completed. On the other hand, if it is determined that the input pixel IDATi is an ineffective pixel, the process proceeds to step S104 where the CPU subtracts a coefficient value K0 for ineffective pixel from a filter coefficient Ki to thereby compute a value of Ki−K0, and adds the computed value of Ki−K0 to a filter coefficient K(i+1) for the right neighboring pixel of the input pixel INDATi to thereby compute a new filter coefficient K(i+1).

Next, the CPU sets the coefficient value K0 for ineffective pixel as the filter coefficient Ki (step S105), increments the pixel position index i by one (step S106), and determines whether or not the pixel position index i is equal to a value of (N+1)/2 (step S107), where N represents the number of taps and the value of (N+1)/2 corresponds to the position of the center pixel among the tap processing object pixels.

If it is determined in step S107 that the pixel position index i is equal to the value of (N+1)/2, the present process is completed. If it is determined that the pixel position index i is not equal to the value of (N+1)/2, the process returns to step S103.

Figure 10:
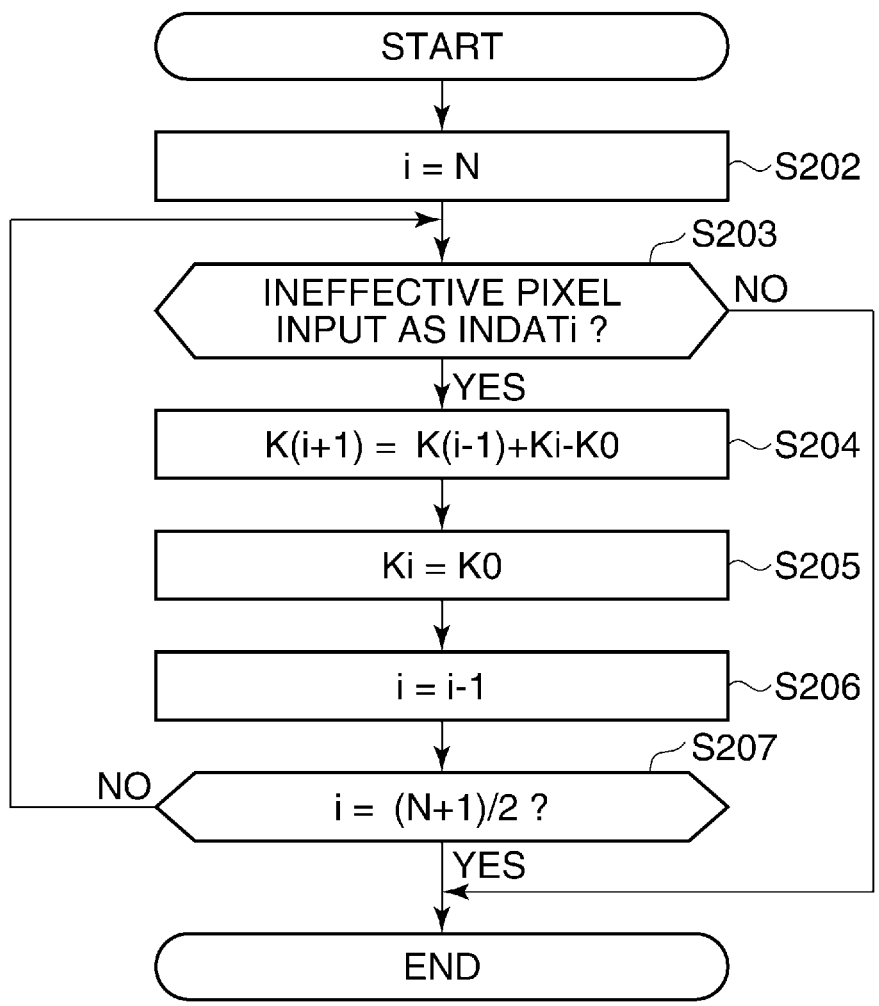
FIG. 10 is a flowchart the procedures of a process for computing filter coefficients for image data on the image right end side according to the first coefficient computation method.

FIG. 10 shows in flowchart the procedures of a process for computing filter coefficients for image data on the image right end side according to the first coefficient computation method.

The CPU of the image processing apparatus initializes a pixel position index i to a value of N (step S202), and determines whether or not an input pixel IDATi is an ineffective pixel (step S203). If it is determined that the input pixel IDATi is not an ineffective pixel, the present process is completed. If it is determined that the input pixel IDATi is an ineffective pixel, the process proceeds to step S204 where the CPU subtracts a coefficient value K0 for ineffective pixel from a filter coefficient Ki to thereby compute a value of Ki−K0, and adds the computed value of Ki−K0 to a filter coefficient K(i−1) for the left neighboring pixel of the input pixel INDATi to thereby compute a new filter coefficient K(i−1).

Next, the CPU sets the coefficient value K0 for ineffective pixel as the filter coefficient Ki (step S205), decrements the pixel position index i by one (step S206), and determines whether or not the pixel position index i is equal to a value of (N+1)/2 (step S207), where N represents the number of taps. If it is determined in step S207 that the pixel position index i is equal to the value of (N+1)/2, the process is completed. If it is determined that the pixel position index i is not equal to the value of (N+1)/2, the process returns to step S203.

FIG. 11A is a table in which an example of filter coefficients computed by the first coefficient computation method is shown.

In FIG. 11A, values of filter coefficients K1 to K11 for use in eleven-tap filter processing are shown to correspond to the pixel-of-interest position that varies from image left end to image right end. Cross marks each represent that a pixel input to a corresponding tap is an ineffective pixel, circle marks each represent that a pixel input to a corresponding tap is an effective pixel, and double-circle marks each represent that a pixel input to a sixth tap is the pixel of interest and is an effective pixel. Each of the values of filter coefficients K1 to K11 shown in FIG. 11A is 66 times as large as an actual value thereof.

A first line (denoted at 1701) of the table corresponds to a case where the pixel of interest is at the image left end. Second to fifth lines denoted at 1702 to 1705 each correspond to a case where the pixel of interest is one of the second to fifth pixels counted from the image left end. A sixth line denoted at 1706 corresponds to a case where the pixel of interest is one of the sixth pixel counted from the image left end through the sixth pixel counted from the image right end.

The bottom line denoted at 1711 corresponds to a case where the pixel of interest is at the image right end. Second to fifth lines from the bottom denoted at 1710 to 1707 each correspond to a case where the pixel of interest is one of the second to fifth pixels counted from the image right end.

Next, a description will be given of filter coefficients computed in the computation process of FIG. 9 in a case where ineffective pixels are present on the image left end side with respect to the pixel of interest.

In the fifth line (denoted at 1705) of the table shown in FIG. 11A, the pixel input to the first tap is an ineffective pixel. A value of the filter coefficient K1 in the fifth line is computed as 0. A value of the filter coefficient K2 in the fifth line is computed as 3 by adding together a value of 1 of the filter coefficient K1 and a value of 2 of the filter coefficient K2 in the sixth line denoted at 1706.

In the fourth line denoted at 1704, the pixel input to the second tap is an ineffective pixel. A value of the filter coefficient K2 in the fourth line is computed as 0. A value of the filter coefficient K3 in the fourth line is computed as 7 by adding together a value of 3 of the filter coefficient K2 and a value of 4 of the filter coefficient K3 in the fifth line denoted at 1705. The fifth line corresponds to the pixel-of-interest position at which ineffective pixels contained in the reference pixel region are smaller by one in number than those contained in the reference pixel region in the fourth line.

Similarly, a value of the filter coefficient K4 in the third line denoted at 1703 is computed as 13, a value of the filter coefficient K5 in the second line denoted at 1702 is computed as 23, and a value of the filter coefficient K6 in the first line denoted at 1701 is computed as 43.

On the other hand, in a case where ineffective pixel are present on the image right end side with respect to the pixel of interest, filter coefficients are computed in the computation process of FIG. 10. For example, a value of the filter coefficient K10 in the seventh line denoted at 1707 is computed as 3, a value of the filter coefficient K9 in the eighth line denoted at 1708 is computed as 7, a value of the filter coefficient K8 in the eighth line denoted at 1709 is computed as 13, a value of the filter coefficient K7 in the tenth line denoted at 1710 is computed as 23, and a value of the filter coefficient K6 in the bottom line denoted at 1711 is computed as 43.

Figure 12:
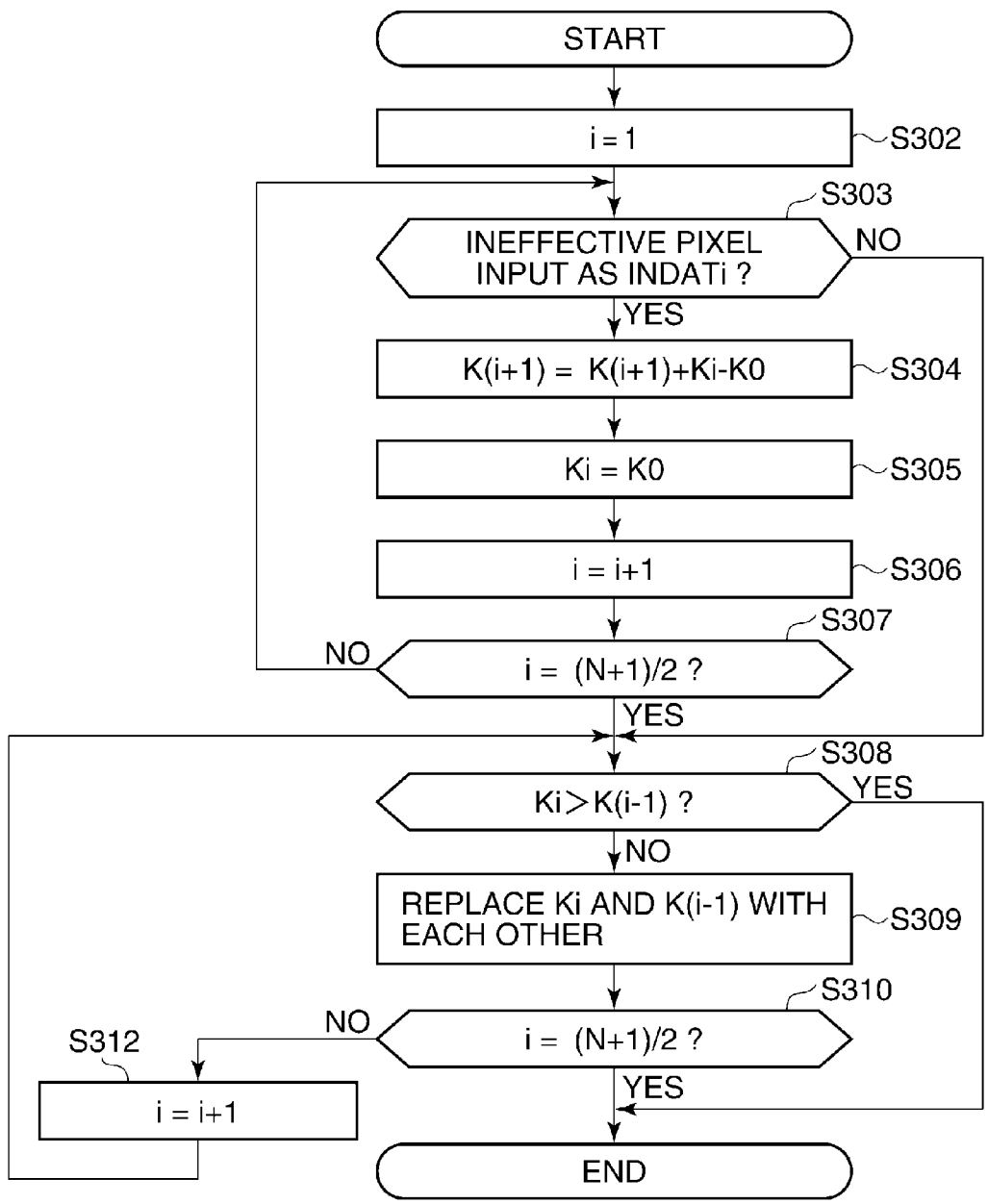
FIG. 12 is a flowchart showing procedures of a process for computing filter coefficients for image data on the image left end side according to the second coefficient computation method.

FIG. 12 shows in flowchart the procedures of a process for computing filter coefficients for image data on the image left end side according to a second coefficient computation method.

The CPU of the image processing apparatus initializes an input pixel position index i to a value of 1 corresponding to a first tap (step S302), and determines whether or not an input pixel IDATi is an ineffective pixel (step S303). If it is determined that the input pixel IDATi is not an ineffective pixel, the process proceeds to step S308. On the other hand, if it is determined that the input pixel IDATi is an ineffective pixel, the process proceeds to step S304 where the CPU subtracts a coefficient value K0 for ineffective pixel from a filter coefficient Ki to thereby compute a value of Ki−K0, and adds the computed value of Ki−K0 to a filter coefficient K (i+1) for the right neighboring pixel to thereby compute a new filter coefficient K(i+1).

Next, the CPU sets the coefficient value K0 for ineffective pixel as the filter coefficient Ki (step S305), increments the pixel position index i by one (step S306), and determines whether or not the pixel position index i is equal to a value of (N+1)/2 (step S307), where N represents the number of taps.

If it is determined in step S307 that the pixel position index i is not equal to the value of (N+1)/2, the process returns to step S303. If it is determined that the pixel position index i is equal to the value of (N+1)/2, the process proceeds to step S308.

In step S308, the CPU determines whether or not the coefficient Ki is larger than a coefficient K(i−1) for the left neighboring pixel. If the answer to step S308 is YES, the present process is completed. On the other hand, if it is determined that the coefficient Ki is not larger than the coefficient K(i−1), the process proceeds to step S309 where the CPU replaces values of the filter coefficients Ki and K(i−1) with each other.

Next, in step S310, the CPU determines whether or not the pixel position index i is equal to the value of (N+1)/2. If the answer to step S310 is YES, the present process is completed. On the other hand, if it is determined that the pixel position index i is not equal to the value of (N+1)/2, the process proceeds to step S312 where the CPU increments the pixel position index i by one, whereupon the process returns to step S308.

Figure 13:
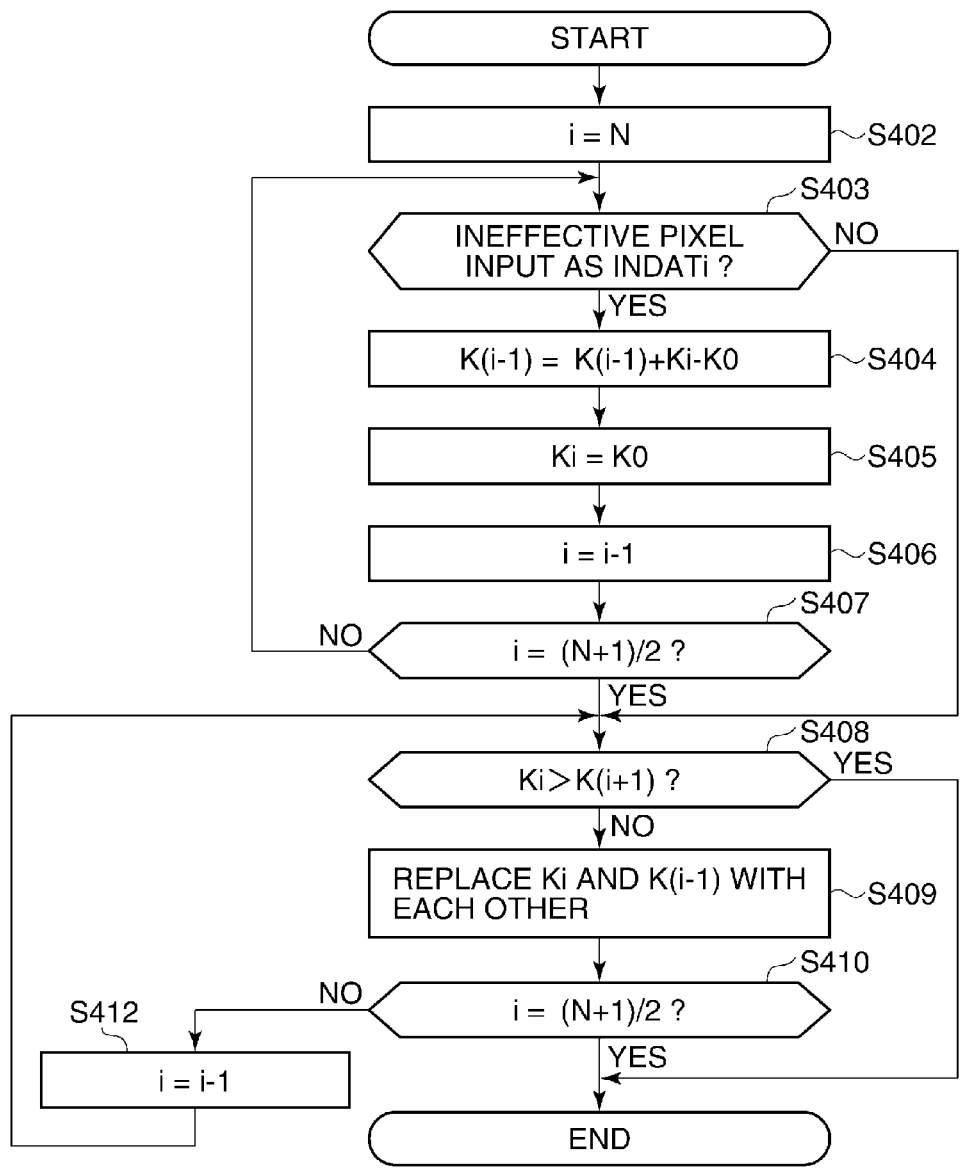
FIG. 13 is a flowchart showing procedures of a process for computing filter coefficients for image data on the image right end side according to the second coefficient computation method.

FIG. 13 shows in flowchart the procedures of a process for computing filter coefficients for image data on the image right end side according to the second coefficient computation method.

The CPU of the image processing apparatus initializes an input pixel position index i to a value of N (step S402), and determines whether or not an input pixel IDATi is an ineffective pixel (step S403). If it is determined that the input pixel IDATi is not an ineffective pixel, the process proceeds to step S408. On the other hand, if it is determined that the input pixel IDATi is an ineffective pixel, the process proceeds to step S404 where the CPU subtracts a coefficient value K0 for ineffective pixel from a filter coefficient Ki to thereby compute a value of Ki−K0, and adds the computed value of Ki−K0 to a filter coefficient K(i−1) for the left neighboring pixel to thereby compute a new filter coefficient K(i−1).

Next, the CPU sets the coefficient value K0 for ineffective pixel as the filter coefficient Ki (step S405), decrements the pixel position index i by one (step S406), and determines whether or not the pixel position index i is equal to a value of (N+1)/2 (step S407), where N represents the number of taps.

If it is determined in step S407 that the pixel position index i is not equal to the value of (N+1)/2, the process returns to step S403. If it is determined that the pixel position index i is equal to the value of (N+1)/2, the process proceeds to step S408.

In step S408, the CPU determines whether or not the coefficient Ki is larger than a coefficient K(i+1) for the right neighboring pixel. If the answer to step S408 is YES, the present process is completed. On the other hand, if it is determined that the coefficient Ki is not larger than the coefficient K(i+1), the process proceeds to step S409 where the CPU replaces values of the filter coefficients Ki and K(i+1) with each other.

Next, in step S410, the CPU determines whether or not the pixel position index i is equal to the value of (N+1)/2. If the answer to step S410 is YES, the present process is completed. On the other hand, if it is determined that the pixel position index i is not equal to the value of (N+1)/2, the process proceeds to step S412 where the CPU decrements the pixel position index i by one, whereupon the process returns to step S408.

FIG. 11B is a table in which an example of filter coefficients computed by the second coefficient computation method is shown.

In FIG. 11B, values of filter coefficients K1 to K11 for use in eleven-tap filter processing are shown to correspond to the pixel-of-interest position, as with the case of FIG. 11A. The meanings of cross marks, circle marks, and double-circle marks are the same as those of FIG. 11A.

A first line (denoted at 1801) of the table corresponds to a case where the pixel of interest is at the image left end. Second to fifth lines denoted at 1802 to 1805 each correspond to a case where the pixel of interest is one of the second to fifth pixels counted from the image left end. A sixth line denoted at 1806 corresponds to a case where the pixel of interest is one of the sixth pixel counted from the image left end through the sixth pixel counted from the image right end.

The bottom line denoted at 1811 corresponds to a case where the pixel of interest is at the image right end. Second to fifth lines from the bottom denoted at 1810 to 1807 each correspond to a case where the pixel of interest is one of the second to fifth pixels counted from the image right end.

Next, a description will be given of filter coefficients computed in the computation process of FIG. 12 in a case where ineffective pixels are present on the image left end side with respect to the pixel of interest.

In the fifth line (denoted at 1805) of the table shown in FIG. 11B, the pixel input to the first tap is an ineffective pixel. A value of the filter coefficient K1 in the fifth line is computed as 0. A value of the filter coefficient K2 in the fifth line is computed as 3 by adding together a value of 1 of the filter coefficient K1 and a value of 2 of the filter coefficient K2 in the sixth line denoted at 1806.

In the fourth line denoted at 1804, the pixel input to the second tap is an ineffective pixel. A value of the filter coefficient K2 in the fourth line is computed as 0. A value of the filter coefficient K3 in the fourth line is computed as 7 by adding together a value of 3 of the filter coefficient K2 and a value of 4 of the filter coefficient K3 in the fifth line denoted at 1805. Since a computed value of 6 of the filter coefficient K4 in the fourth line is smaller than the computed value of 7 of filter coefficient K3 in the fourth line, the values of the filter coefficients K3, K4 are replaced with each other, so that the filter coefficients K3, K4 are set to values of 6 and 7, respectively. Since a computed value of 10 of the filter coefficient K5 is larger than the computed value of 7 of the filter coefficient K4, the computation of the filter coefficients in the fourth line is completed.

Similarly, values of the filter coefficients in the third line, values of the filter coefficients in the second line, and values of the filter coefficients in the first line are respectively computed.

As described above, by using the first to M-th coefficient tables 106A to 106M, the filter coefficient changeover control signal KWIN, and the output image region control signal OUTWIN, image processing can properly be performed even in vicinity of image ends based on reference pixels determined by taking account of effective pixels, whereby image quality deterioration in the output image region determined based on reference pixel regions including image ends can be suppressed to a minimum.

By switching the coefficient tables by the coefficient set selection control unit 105 according to various conditions, proper image quality design can be achieved even in vicinity of the image ends.

In the above-described embodiment, the image processor is implemented by an FIR filter, but this is not limitative.

In the embodiment, the setting contents of the first to third coefficient tables among the coefficient tables are shown by way of example in FIGS. 5A to 5C. Similarly, the setting contents of other coefficient tables can be set.

In the embodiment, horizontal image processing has been described by way of example. Vertical image processing can be carried out in a similar manner.

In the embodiment, the first and second coefficient computation methods have been described, but these are not limitative. The coefficient tables can be variously defined depending on the number of taps in filter processing.

Second Embodiment

In a second embodiment of this invention, a reference pixel region in image processing (e.g., the number of taps of an FIR filter) is controlled in vicinity of the image ends.

Figure 14:
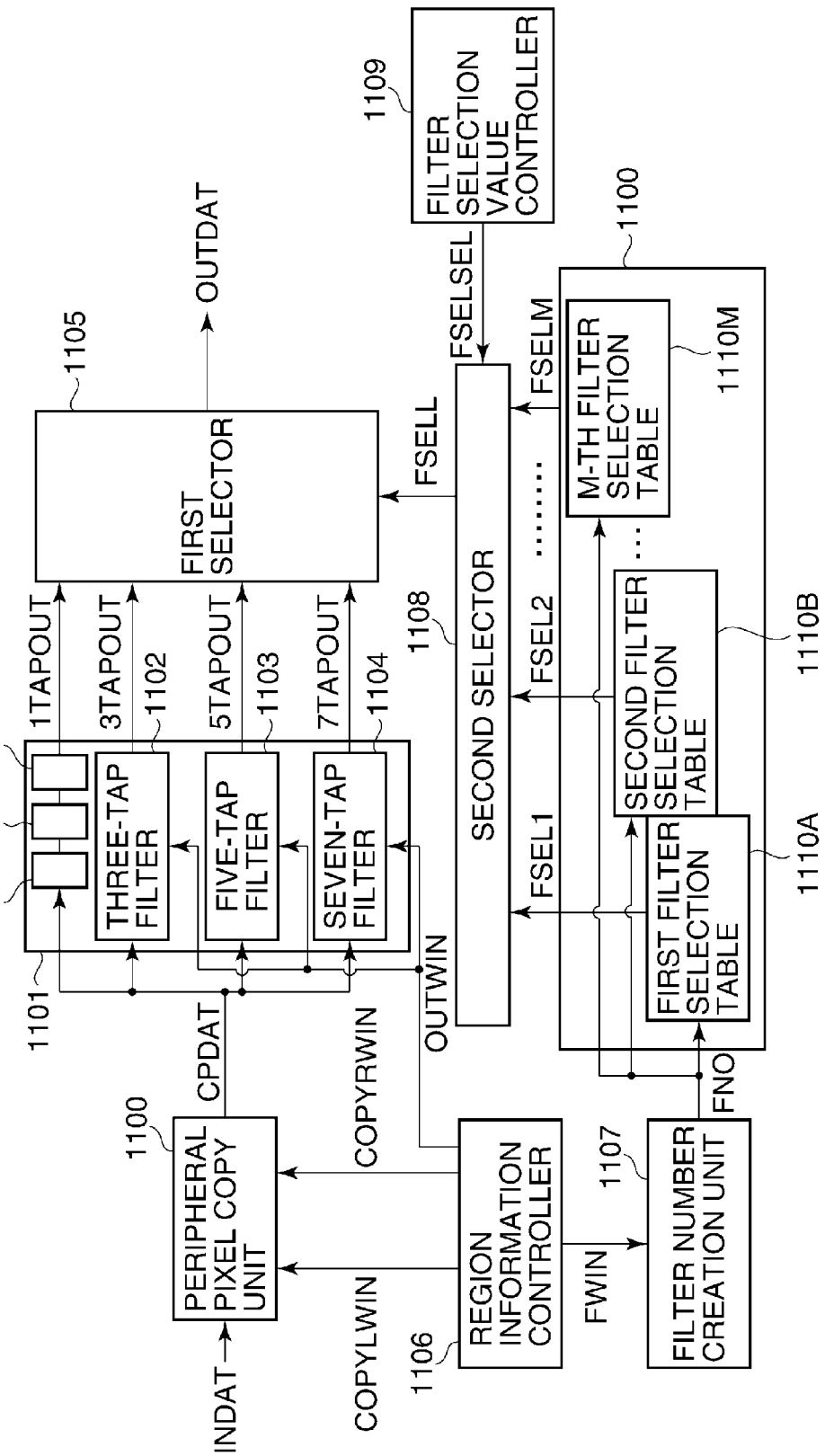
FIG. 14 is a block diagram showing an example construction of an image processing apparatus according to a second embodiment of this invention.

FIG. 14 shows in block diagram an example construction of an image processing apparatus according to the second embodiment of this invention. The image processing apparatus constitutes the image processor 424 of the image pickup apparatus 4100 shown in FIG. 2.

In FIG. 14, reference numeral 1101 denotes a peripheral pixel copy unit that performs first image processing to copy effective pixels at image ends of input image data INDAT to ineffective pixel regions located outward of the image ends to replace the ineffective pixels with the effective pixels, whereby an effective image region is artificially expanded in outward directions. The peripheral pixel copy unit 1100 outputs to an image processor 1101 image data CPDAT obtained by the first image processing performed on the input image data INDAT.

The image processor 1101 includes D flip-flops (D-FFs) 1113 to 1115 which are delay elements for holding and shifting pixel values of the image data CPDAT, a three-tap filter 1102, a five-tap filter 1103, and a seven-tap filter 1104, and performs filter processing (second image processing) on the image data CPDAT.

The D-FFs 1113 to 1115 as a whole operate to delay the image data CPDAT by three clocks, and output a delay output 1TAPOUT. The three-tap filter 1102 performs three-tap filter processing based on a reference pixel region including a pixel of interest and two peripheral pixels, and outputs a three-tap filter output 3TAPOUT. The five-tap filter 1103 outputs a five-tap filter output 5TAPOUT, and the seven-tap filter 1104 outputs a seven-tap filter output 7TAPOUT.

A first selector 1105 is implemented by, e.g., MUX, selects one of the delay output 1TAPOUT and the filter outputs 3TAPOUT, 5TAPOUT, and 7TAPOUT according to a filter selection value FSEL supplied to the selector 1105, and outputs the selected output as output image data OUTDAT.

Reference numeral 1106 denotes a region information controller that outputs control signals COPYLWIN, COPYRWIN, OUTWIN, and FWIN respectively representing a region to be copied with an image left end pixel, a region to be copied with an image right end pixel, an image output region, and an image region for filter selection. The control signal OUTWIN is supplied to the three-tap, five-tap, and seven-tap filters 1102 to 1104.

Reference numeral 1107 denotes a filter number creation unit that creates filter number information FNO according to the image region represented by the control signal FWIN supplied from the image region controller 1106.

A filter selection table unit 1110 includes a plurality of, e.g., first to M-th filter selection tables 1110A to 1110M for respectively outputting first to M-th filter selection values FSEL1 to FSELM in accordance with the filter number information FNO.

A second selector 1108 outputs to the first selector 1105 a filter selection value FSEL selected from the first to M-th filter selection values FSEL1 to FSELM in accordance with a filter set selection value FSELSEL supplied from a filter selection value controller 1109.

FIG. 15 collectively shows an example of contents of the first to third filter selection tables 1110A to 1110C of the filter selection table unit 1110 shown in FIG. 14.

As shown in FIG. 15, the first to third filter selection tables 1110A to 1110C are respectively set with first to third filter selection values FSEL1 to FSEL3 that vary according to the filter number information FNO (0 to 7) output from the filter number creation unit 1107.

The first filter selection value FSEL1 assumes a value of 1tap or 3tap, the second filter selection value FSEL2 assumes a value of 1tap, 3tap, or 5tap, and the third filter selection value FSEL3 assumes a value of 1tap, 5tap, or 7tap. The value of 1tap represents that the delay output 1TAPOUT is to be selected, the value of 3tap represents that the filter output 3TAPOUT is to be selected, the value of 5tap represents that the filter output 5TAPOUT is to be selected, and the value of 7tap represents that the filter output 7TAPOUT is to be selected.

FIGS. 16A to 16D are a timing chart of input and output signals in the image processing apparatus shown in FIG. 14.

The image processing apparatus performs image processing on a per pixel basis in accordance with sync clock signals CLK. In the illustrated example, the clock signals CLK are numbered consecutively beginning from 1 and referred to as clocks 1, 2, 3, and so on.

The image processing apparatus inputs the input image data INDAT one pixel by one pixel in accordance with the clock signals CLK. At clocks 1 and 2 and at and after clock 19, no effective pixel values of the input image data INDAT are input to the image processing apparatus (as shown by undefined values X). At clocks 3 to 18, effective pixel values D1 to Dn (whose illustration is partly omitted) of the input image data INDAT are sequentially input to the image processing apparatus. Symbol D1 represents a pixel value at the image left end, and Dn (e.g., D16) represents a pixel value at the image right end.

At clocks 3 and 4, the control signal COPYLWIN representing a region to be copied with an image left end pixel becomes an H level. At clocks 4 and 5 (i.e., in the image left end copy region), the pixel value D1 at the image left end of the input image data INDAT is copied, whereby the first two pixel values of image data CPDAT are generated.

At clocks 21 and 22, the control signal COPYRWIN representing a region to be copied with an image right end pixel becomes an H level. At clocks 22 and 23 (i.e., in the image right end copy region), the pixel value Dn (D16) at the image right end of the input image data INDAT is copied, whereby the last two pixel values of image data CPDAT are generated.

An output image region of the output image data OUTDAT is controlled in accordance with an output image region control signal OUTWIN that becomes an H level for a time period corresponding to the effective pixel region of the input image data INDAT. By setting the output image region based on the H level time period of the control signal OUTWIN, the output image region can be controlled properly so as to correspond to the effective pixel region of the input image data INDAT.

During the H level time period of the output image region information OUTWIN, pixel values O1 to On of the output image data OUTDAT are sequentially output at clocks 9 to 24. Symbol O1 represents the pixel value at the left end of the output image, and On (=O16) represents the pixel value at the right end of the output image.

Figure 16A:
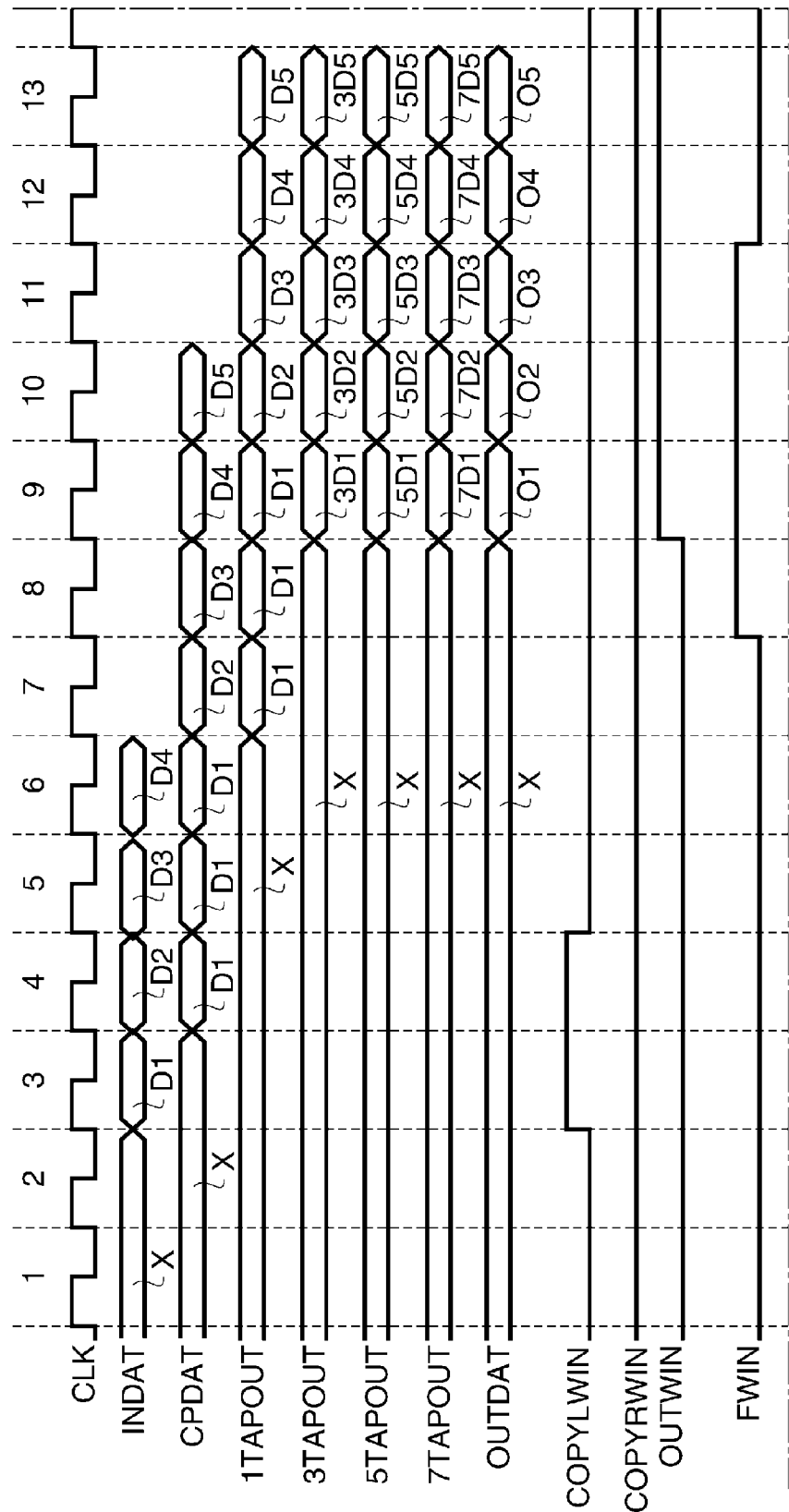
FIGS. 16A to 16D are a timing chart of input and output signals in the image processing apparatus shown in FIG. 14.
Figure 16B:
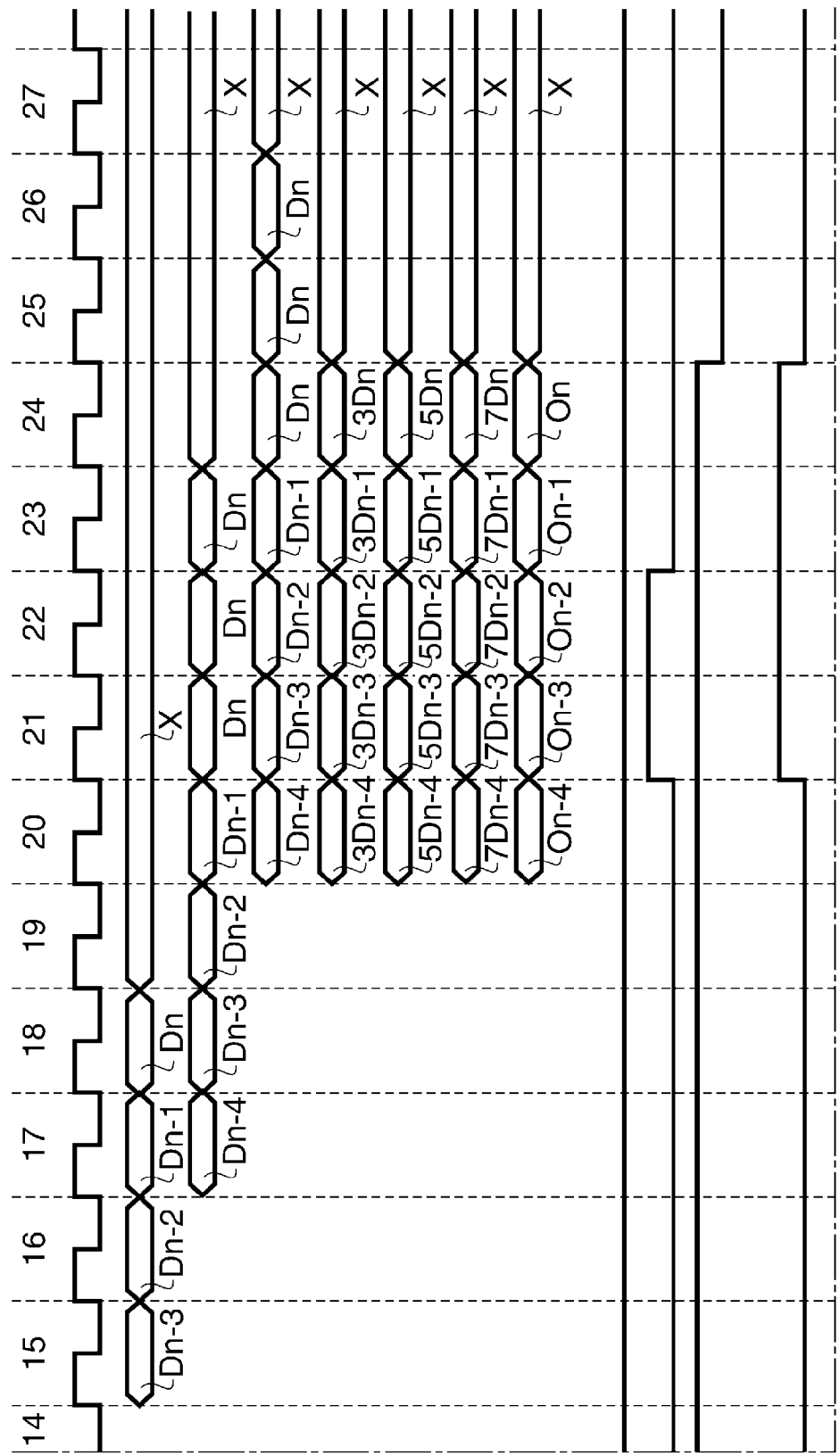
Figure 16C:
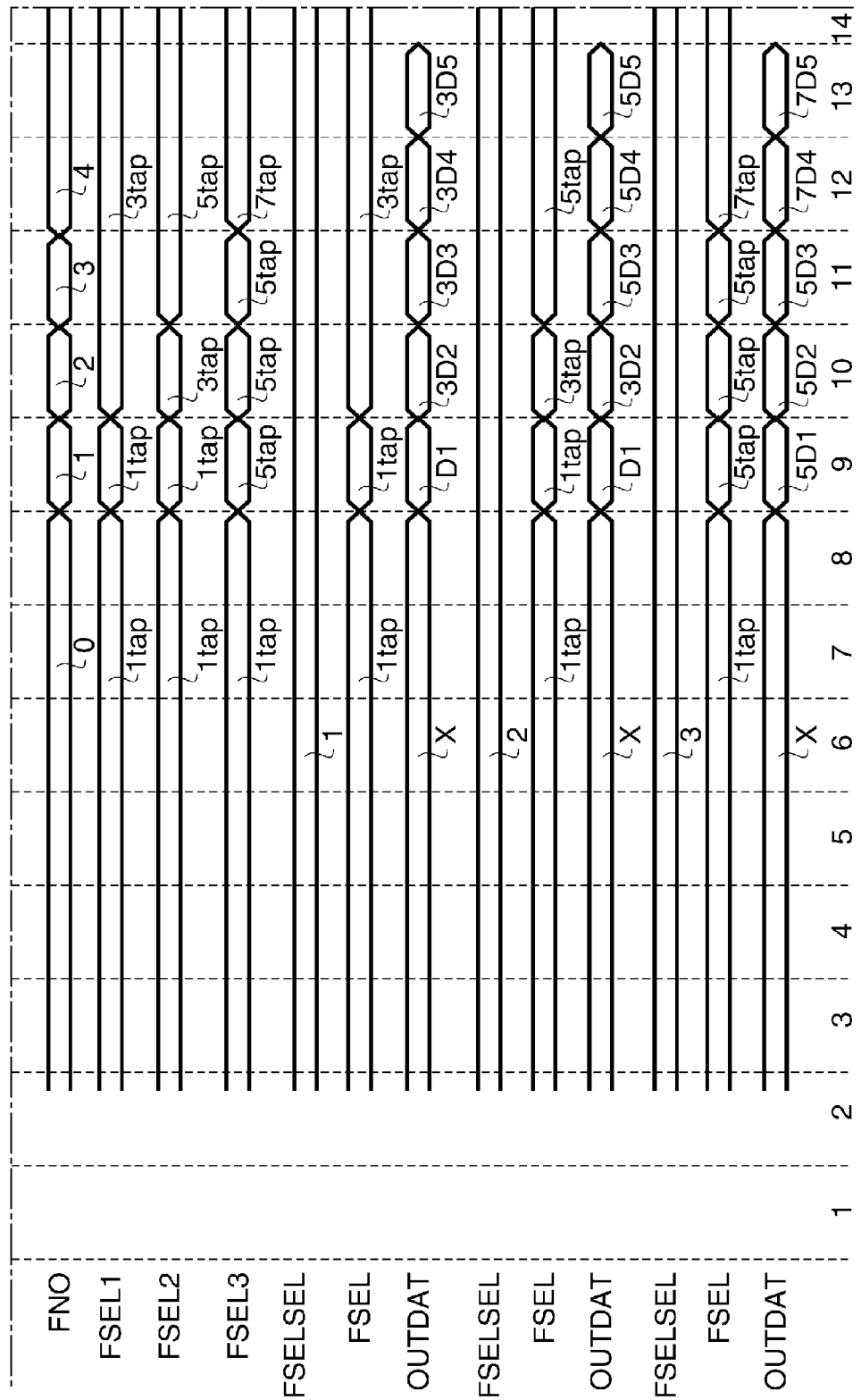
Figure 16D:
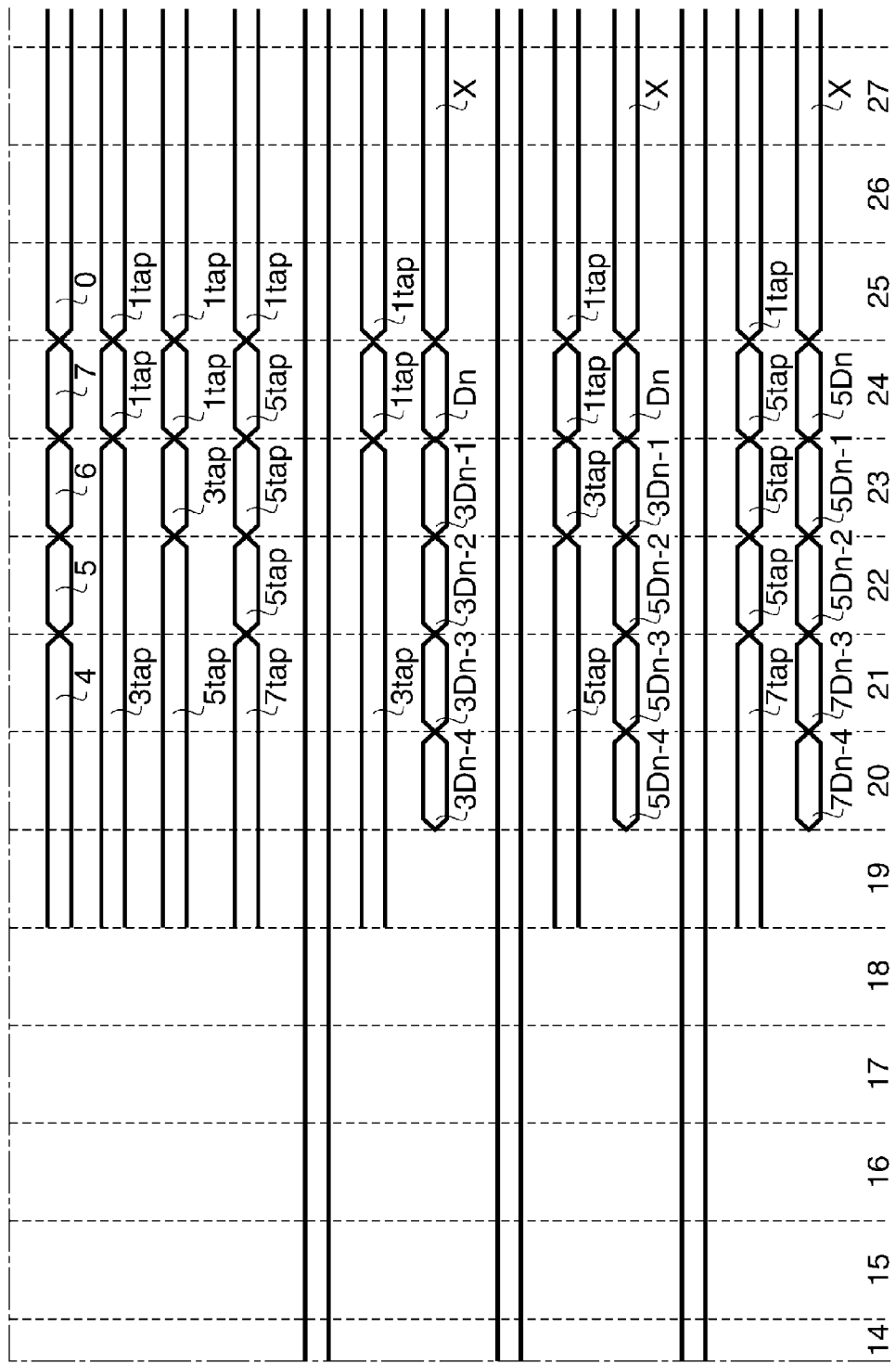

Filter number information FNO is controlled based on the control signal FWIN representing an image region for filter selection and output from the filter number creation unit 1107. In this embodiment, the filter number information FNO can vary from an initial value of 0 to a maximum value of 7, and is incremented by one at a clock next to a clock where the control signal KWIN is at H level. Specifically, as shown in FIGS. 16C and 16D, the filter number information FNO is at the initial value of 0 at clocks 1 to 8, is incremented by one at each clock to assume from a value of 1 to a value of 4 at clocks 9 to 12, and is maintained at a value of 4 at clocks 13 to 21. Then, the filter number information FNO is incremented by one at each clock to assume from a value of 5 to a value of 7 at clocks 22 to 24, and returns to the initial value of 0 at clock 25.

In accordance with the filter number information FNO, first to third filter selection values FSEL1 to FSEL3 are output from respective ones of the first to third filter selection tables 1110A to 1110C, which are shown in FIGS. 14 and 15.

In the following, the first filter selection value FSEL1 is first described. At clocks 1 to 9, the filter number information FNO has a value of 0 or 1, and the filter selection value FSEL1 assumes a value of 1tap representing that the delay output 1TAPOUT is to be selected. At clocks 10 to 23, the filter number information FNO has one of values 2 to 6, and the filter selection value FSEL1 assumes a value of 3tap representing that the filter output 3TAPOUT is to be selected. At and after clock 24, the filter number information FNO has a value of 7 or 0, and the filter selection value FSEL1 assumes a value of 1tap.

The second filter selection value FSEL2 assumes a value of 1tap at clocks 1 to 9, assumes a value of 3tap at clock 10, assumes a value of 5tap at clocks 11 to 22, assumes a value of 3tap at clock 23, and assumes a value of 1tap at and after clock 24.

The third filter selection value FSEL3 assumes a value of 1tap at clocks 1 to 8, assumes a value of 5tap at clocks 9 to 11, assumes a value of 7tap at clocks 12 to 21, assumes a value of 5tap at clocks 22 to 24, and assumes a value of 1tap at and after clock 25.

In a case that the filter set selection value FSELSEL has a value of 1, the first filter selection value FSEL1 is selected as the filter selection value FSEL by the second selector 1108, and values of D1, 3D2, 3D3, . . . , 3Dn−1, and Dn are output as the pixel values O1 to On of the output image data OUT-DAT.

In a case that the filter set selection value FSELSEL has a value of 2, the second filter selection value FSEL2 is selected as the filter selection value FSEL by the second selector 1108, and values of D1, 3D2, 5D3, . . . , 3Dn−1, and Dn are output as the pixel values O1 to On of the output image data OUT-DAT.

In a case that the filter set selection value FSELSEL has a value of 3, the third filter selection value FSEL3 is selected as the filter selection value FSEL by the second selector 1108, and values of 5D1, 5D2, 5D3, . . . , 5Dn−1, and 5Dn are output as the pixel values O1 to On of the output image data OUT-DAT.

Figure 17:
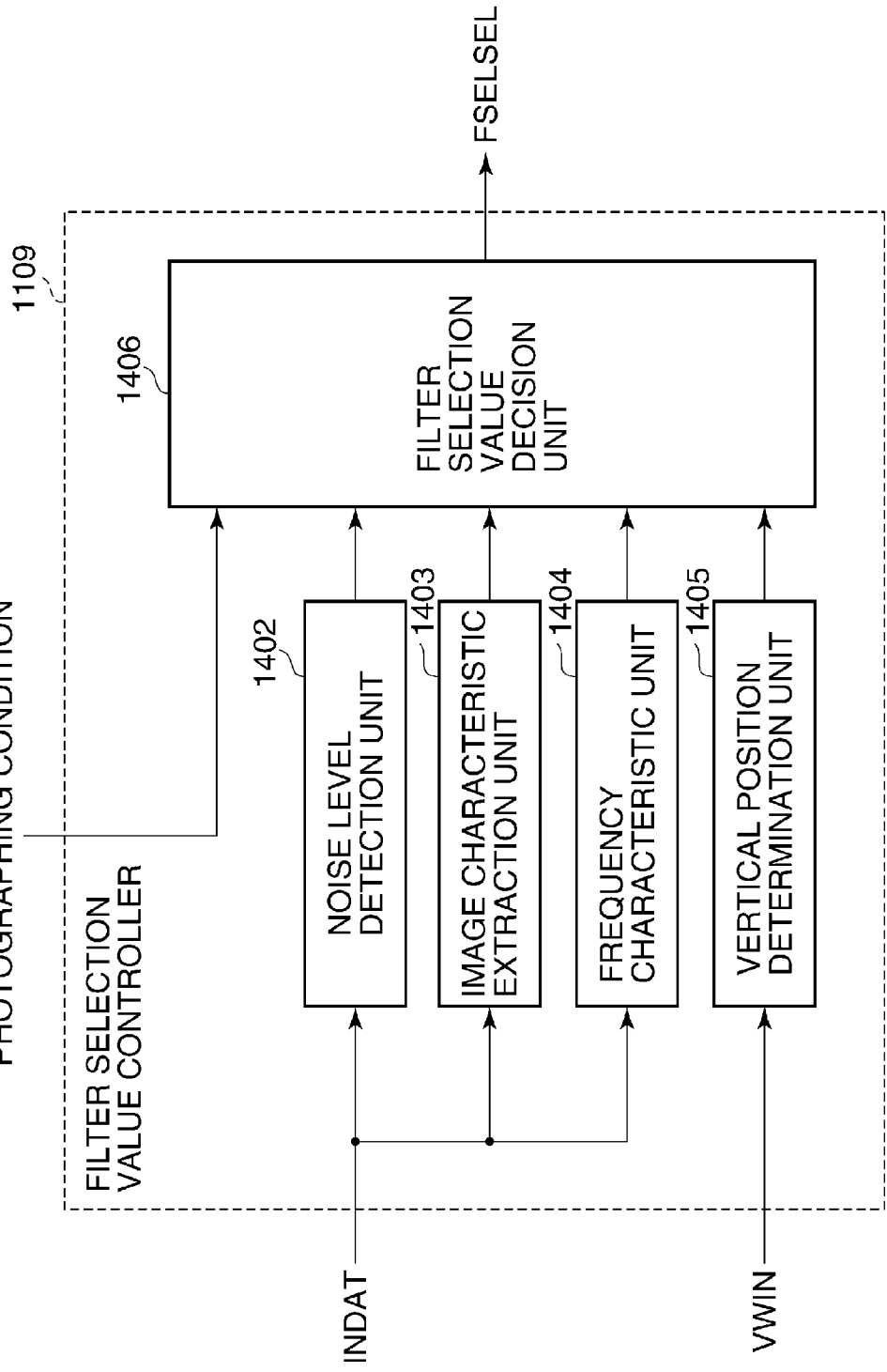
FIG. 17 is a view showing an internal construction of a filter selection value controller of the image processing apparatus shown in FIG. 14.
Figure 20:
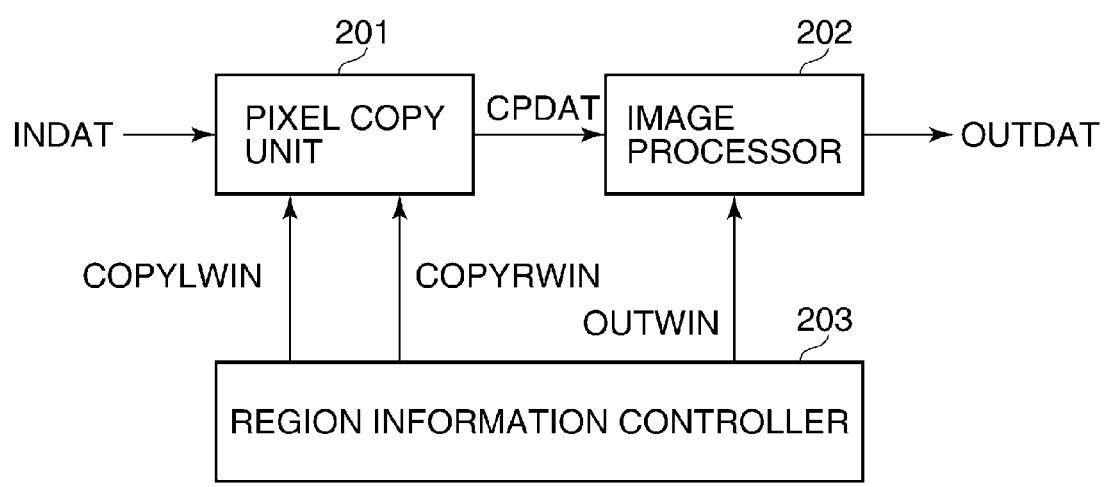
FIG. 20 is a block diagram showing an example construction of a conventional image processing apparatus.
Figure 21:
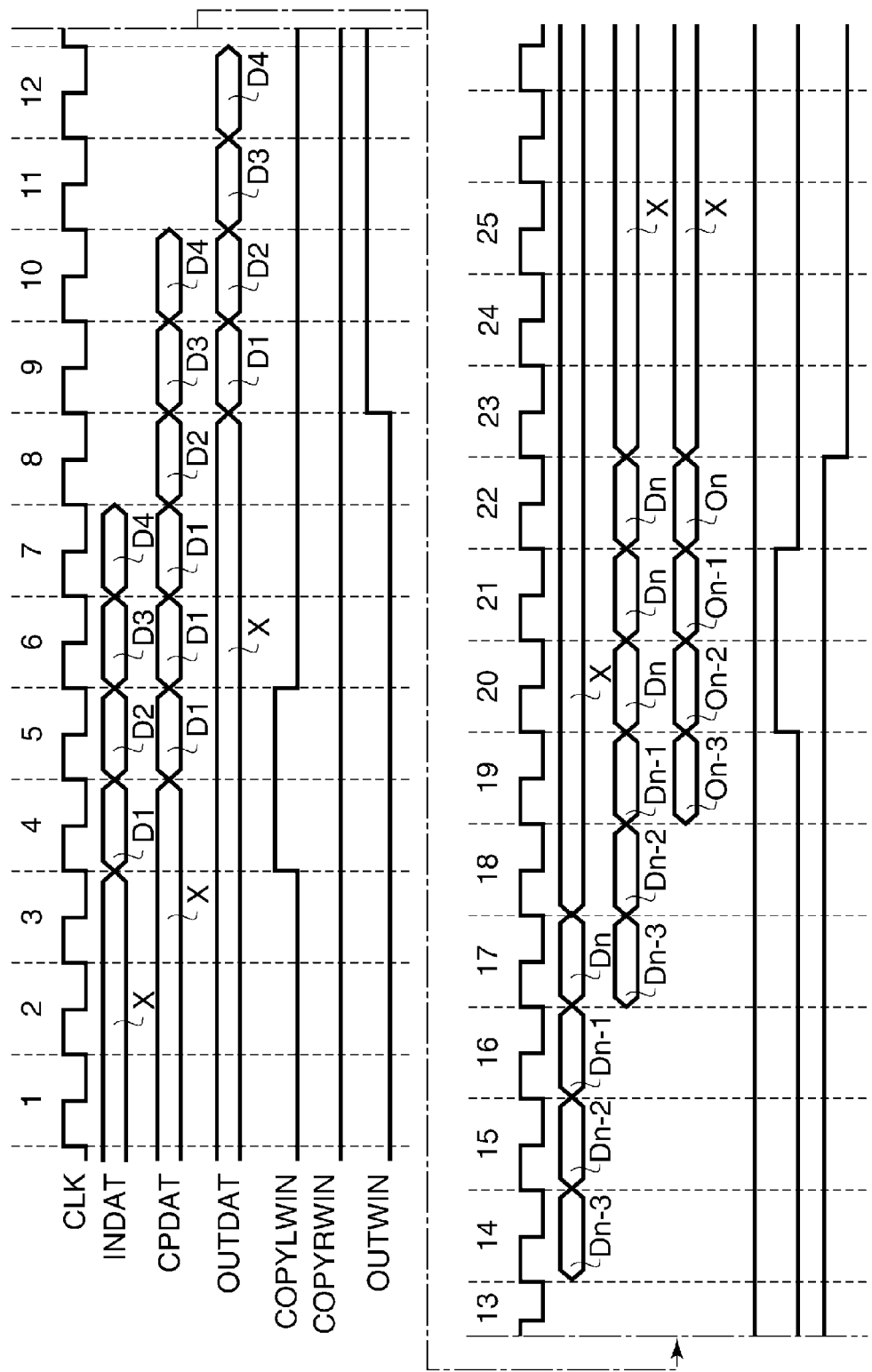
FIG. 21 is a timing chart of input and output signals in the image processing apparatus of FIG. 20.

FIG. 17 shows an internal construction of the filter selection value controller 1109 shown in FIG. 14.

In FIG. 17, reference numerals 1402 to 1405 denote a noise level detection unit, an image characteristic extraction unit, a frequency characteristic unit, and a vertical position determination unit that respectively correspond to the noise level detection unit 902, image characteristic extraction unit 903, frequency characteristic unit 904, and vertical position determination unit 905, which are shown in FIG. 7.

Reference numeral 1406 denotes a filter selection value decision unit that determines for output the filter selection value control signal FSELSEL based on photographing condition, noise level, image characteristic, frequency band, and distance information.

FIGS. 18A to 18E show example tables referred to by the filter selection value decision unit 1406 shown in FIG. 17 to determine the filter selection value control signal FSELSEL.

FIG. 18A shows a table indicating a relation between photographing condition (ISO sensitivity in this example) and first filter selection value control signal FSELSELa. In the illustrated example, the first filter selection value control signal FSELSELa is set to a value of FSELSEL1 when the ISO sensitivity has a value less than 400, is set to a value of FSELSEL2 when the ISO sensitivity has a value equal to or larger than 400 but less than 1600, and is set to a value of FSELSEL3 when the ISO sensitivity has a value equal to or larger than 1600. The value of FSELSEL1 is smaller than the value of FSELSEL2, which is smaller than the value of FSELSEL3. The photographing condition is not limited to ISO sensitivity, but may be, e.g., a TV value determined depending on shutter speed.

FIG. 18B shows a table indicating a relation between noise level (S/N ratio in this example) and second filter selection value control signal FSELSELb. The second filter selection value control signal FSELSELb is set to a value of FSELSEL1 when the S/N ratio is equal to or higher than 30 dB, is set to a value of FSELSEL2 when the S/N ratio is equal to or larger than 10 dB but lower than 30 dB, and is set to a value of FSELSEL3 when the S/N ratio is lower than 10 dB.

FIG. 18C shows a table indicating a relation between image characteristic and third filter selection value control signal FSELSELc. The third filter selection value control signal FSELSELc is set to a value of FSELSEL1 when the image characteristic corresponds to a vertical edge image, is set to a value of FSELSEL2 when the image characteristic corresponds to an oblique edge image, and is set to a value of FSELSEL3 when the image characteristic corresponds to a horizontal edge image or a solid image. In this example, a case has been described where horizontal image processing is performed. In the case of vertical image processing, the value of FSELSEL1 is used for a horizontal edge image, the value of FSELSEL2 is used for an oblique edge image, and the value of FSELSEL3 is used for a vertical edge image.

FIG. 18D shows a table indicating a relation between frequency characteristic (image frequency band in this example) and fourth filter selection value control signal FSELSELd. The fourth filter selection value control signal FSELSELd is set to a value of FSELSEL1 for a high-frequency band image, is set to a value of FSELSEL2 for a middle-frequency band image, and is set to a value of FSELSEL3 for a low-frequency band image.

FIG. 18E shows a table indicating a relation between position of a pixel of interest (which is an image processing object) from image end and fifth filter selection value control signal FSELSELe. The fifth filter selection value control signal FSELSELe is set to a value of FSELSEL1 when the pixel of interest is located four pixels or more away from the image end (upper end or lower end in this example), is set to a value of FSELSEL2 when the pixel of interest is located two or three pixels away from the image end, and is set to a value of FSELSEL3 when the pixel of interest is located at the image end. In this example, a case has been described where horizontal image processing is performed. In the case of vertical image processing, the values of FSELSEL1, FSELSEL2, and FSELSEL3 are used in this order with decrease of the distance between the pixel-of-interest position and the image left or right end.

The filter selection value decision unit 1406 determines the filter selection value control signal FSELSEL from the first to fifth filter selection value control signals FSELSELa to FSELSELe decided based on the tables shown in FIGS. 18A to 18E. For example, a maximum value of the first to fifth filter selection value control signals FSELSELa to FSELSELe can be determined as the filter selection value control signal FSELSEL.

As described above, by using the first to M-th filter selection tables 1110A to 1110M, the filter selection region control signal FWIN, and the output image region control signal OUTWIN, image processing can properly be performed by taking account of effective pixel regions in vicinity of image ends.

By switching the filter selection tables by the filter selection value controller 1109 according to various conditions, proper image processing can be carried out even in vicinity of image ends.

In the above-described embodiment, the image processor is configured by an N tap filter, but this is not limitative.

In the embodiment, the contents of the first to third filter selection tables are shown by way of example in FIG. 15. Similarly, the contents of other filter selection tables can be set.

In the embodiment, horizontal image processing has been described by way of example. Vertical image processing can be carried out in a similar manner.

In the embodiment, a case has been described in which the first image processing to replace ineffective pixels with effective pixels is performed by the peripheral pixel copy unit 1101, but this is not limitative. For example, proper image processing can be achieved in vicinity of the image ends by using the filters 1102 to 1104 each configured to have a function for performing image processing in which effective pixels at image ends are taken into account or by using filters dedicated for image processing in vicinity of the image ends, instead of the peripheral pixel copy unit 1101.

For coefficient computation in the second embodiment, the two coefficient computation methods described in the first embodiment can be applied without modification.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-266974, filed Nov. 30, 2010, which is hereby incorporated by reference herein in its entirety.

What is claimed is:

1. An image processing apparatus having an image processing unit that performs arithmetic processing on image data on a per pixel of interest basis while referring to peripheral pixels, comprising:
   a region information control unit configured to control image region information;
   a coefficient selection value generation unit configured to generate a coefficient selection value based on the image region information supplied from said region information control unit;
   a table unit having coefficient tables configured to output coefficient sets, which are different from one another, in accordance with the coefficient selection value generated by said coefficient selection value generation unit;
   a coefficient set selection unit configured to generate a coefficient set selection value; and
   a table selection unit configured to select one of the coefficient sets in accordance with the coefficient set selection value generated by said coefficient set selection unit,
   wherein the image processing unit performs arithmetic processing on the image data by using coefficients that constitute the coefficient set selected by said table selection unit.

2. The image processing apparatus according to claim 1, further including:
   a determination unit configured to determine whether an input pixel is an ineffective pixel,
   wherein in a case where it is determined by said determination unit that the input pixel is an ineffective pixel, the image processing unit computes a coefficient to be applied to the input pixel by adding together a coefficient to be applied to a corresponding input pixel at a pixel-of-interest position at which ineffective pixels included in a reference pixel region are smaller by one in number than those included in a reference pixel region for the input pixel and a coefficient to be applied to a neighboring pixel of the corresponding input pixel.

3. The image processing apparatus according to claim 2, wherein in a case where the input pixel is located on an image left end side, the image processing unit computes the coefficient to be applied to the input pixel by adding together the coefficient to be applied to the corresponding input pixel and a coefficient to be applied to a right neighboring pixel of the corresponding input pixel, and
   in a case where the input pixel is located on an image right end side, the image processing unit computes the coefficient to be applied to the input pixel by adding together the coefficient to be applied to the corresponding input pixel and a coefficient to be applied to a left neighboring pixel of the corresponding input pixel.

4. The image processing apparatus according to claim 2, wherein in a case where the coefficient to be applied to the input pixel is equal to or less than a coefficient to be applied to a left or right neighboring pixel of the input pixel, the image processing unit replaces the coefficients to be respectively applied to the input pixel and the left or right neighboring pixel with each other.

5. The image processing apparatus according to claim 1, wherein said coefficient set selection unit generates the coefficient set selection value based on at least one of a photographing condition indicated in the image data, a noise level detected from the image data, an image characteristic extracted from the image data, a frequency band detected from the image data, and a distance between the pixel of interest and an image end.

6. The image processing apparatus according to claim 5, wherein the photographing condition includes an ISO sensitivity, and the image characteristic includes an edge image or a solid image.

7. The image processing apparatus according to claim 2, wherein in a case where the input pixel is an ineffective pixel, the coefficient to be applied to the input pixel is set to a value of 0.

8. An image processing method including an image processing step of performing arithmetic processing on image data on a per pixel of interest basis while referring to peripheral pixels, comprising:
    a determination step of determining whether an input pixel is an ineffective pixel,
    wherein in a case where it is determined in said determination step that the input pixel is an ineffective pixel, a coefficient to be applied to the input pixel is computed in the image processing step by adding together a coefficient to be applied to a corresponding input pixel at a pixel-of-interest position at which ineffective coefficients included in a reference pixel region are smaller by one in number than those included in a reference pixel region for the input pixel and a coefficient to be applied to a neighboring pixel of the corresponding input pixel.

9. The image processing method according to claim 8, wherein in a case where the input pixel is located on an image left end side, the coefficient to be applied to the input pixel is computed in the image processing step by adding together the coefficient to be applied to the corresponding input pixel and a coefficient to be applied to a right neighboring pixel of the corresponding input pixel, and
    in a case where the input pixel is located on an image right end side, the coefficient to be applied to the input pixel is computed in the image processing step by adding together the coefficient to be applied to the corresponding input pixel and a coefficient to be applied to a left neighboring pixel of the corresponding input pixel.

10. A non-transitory computer-readable storage medium storing a program for causing an image processing apparatus to execute an image processing method including an image processing step of performing arithmetic processing on image data on a per pixel of interest basis while referring to peripheral pixels, comprising:
    a determination step of determining whether an input pixel is an ineffective pixel,
    wherein in a case where it is determined in said determination step that the input pixel is an ineffective pixel, a coefficient to be applied to the input pixel is computed in the image processing step by adding together a coefficient to be applied to a corresponding input pixel at a pixel-of-interest position at which ineffective coefficients included in a reference pixel region are smaller by one in number than those included in a reference pixel region for the input pixel and a coefficient to be applied to a neighboring pixel of the corresponding input pixel.

11. A method of controlling an image processing apparatus having an image processing unit that performs arithmetic processing on image data on a per pixel of interest basis while referring to peripheral pixels, the method comprising:
    a region information control step of controlling image region information;
    a coefficient selection step of generating a coefficient selection value based on the image region information supplied from said region information control step;
    a table step of outputting coefficient sets, which are different from one another, in accordance with the coefficient selection value generated by said coefficient selection step;
    a coefficient set selection step of generating a coefficient set selection value; and
    a table selection step of selecting one of the coefficient sets in accordance with the coefficient set selection value generated by said coefficient set selection step,
    wherein the image processing unit performs arithmetic processing on the image data by using coefficients that constitute the coefficient set selected by said table selection step.

12. A non-transitory computer-readable storage medium storing a program for causing an image processing apparatus to execute a method of controlling an image processing apparatus having an image processing unit that performs arithmetic processing on image data on a per pixel of interest basis while referring to peripheral pixels, the method comprising:
    a region information control step of controlling image region information;
    a coefficient selection step of generating a coefficient selection value based on the image region information supplied from said region information control step;
    a table step of outputting coefficient sets, which are different from one another, in accordance with the coefficient selection value generated by said coefficient selection step;
    a coefficient set selection step of generating a coefficient set selection value; and
    a table selection step of selecting one of the coefficient sets in accordance with the coefficient set selection value generated by said coefficient set selection step,
    wherein the image processing unit performs arithmetic processing on the image data by using coefficients that constitute the coefficient set selected by said table selection step.

\* \* \* \* \*